US007558922B2

(12) United States Patent
Murase

(10) Patent No.: US 7,558,922 B2
(45) Date of Patent: Jul. 7, 2009

(54) APPARATUS AND METHOD FOR QUICK RETRIEVAL OF SEARCH DATA BY PRE-FETECHING ACTUAL DATA CORRESPONDING TO SEARCH CANDIDATE INTO CACHE MEMORY

(75) Inventor: Atsushi Murase, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 398 days.

(21) Appl. No.: 11/321,607

(22) Filed: Dec. 28, 2005

(65) Prior Publication Data

US 2007/0150450 A1 Jun. 28, 2007

(51) Int. Cl.
*G06F 13/00* (2006.01)
(52) U.S. Cl. .................. 711/137; 711/204; 711/213
(58) Field of Classification Search .............. 711/137, 711/204, 213
See application file for complete search history.

(56) References Cited

U.S. PATENT DOCUMENTS

| 4,914,569 | A | * | 4/1990 | Levine et al. ............... 707/8 |
| 5,960,194 | A | * | 9/1999 | Choy et al. ................. 707/102 |
| 7,092,971 | B2 | | 8/2006 | Idei et al. |
| 2001/0034814 | A1 | * | 10/2001 | Rosenzweig ................ 711/118 |
| 2002/0107847 | A1 | * | 8/2002 | Johnson ..................... 707/3 |
| 2002/0147704 | A1 | * | 10/2002 | Borchers ..................... 707/3 |
| 2004/0054661 | A1 | * | 3/2004 | Cheung et al. ............... 707/3 |
| 2005/0165777 | A1 | * | 7/2005 | Hurst-Hiller et al. ......... 707/4 |
| 2006/0026170 | A1 | * | 2/2006 | Kreitler et al. .............. 707/10 |
| 2006/0155915 | A1 | * | 7/2006 | Pereira ..................... 711/100 |
| 2006/0212658 | A1 | * | 9/2006 | Hrle et al. ................. 711/137 |
| 2006/0235824 | A1 | * | 10/2006 | Cheung et al. .............. 707/1 |

* cited by examiner

*Primary Examiner*—Reba I Elmore
(74) *Attorney, Agent, or Firm*—Sughrue Mion, PLLC

(57) ABSTRACT

A storage system includes a client host, a storage device, and a separate data search appliance. The client software executing on the client host composes a query and sends a data search request to the storage device. The storage device passes the received query to the connected data search appliance. The search appliance invokes search process to find search candidates using meta information of the data stored in the storage device. Upon the completion of the search process, the search appliance returns the identified search results to the storage device. Upon receipt of the search results from the search appliance, the storage device passes them to the client. At the same time, the storage device pre-fetches the actual data which corresponds to the search results into its cache memory to ensure fast future retrieval. When the client requests to retrieve actual data corresponding to any of the search results from the storage device, the storage device returns the desired data immediately from its cache memory. If the client requests to retrieve additional data corresponding to another search result, these data is returned immediately as well.

28 Claims, 25 Drawing Sheets

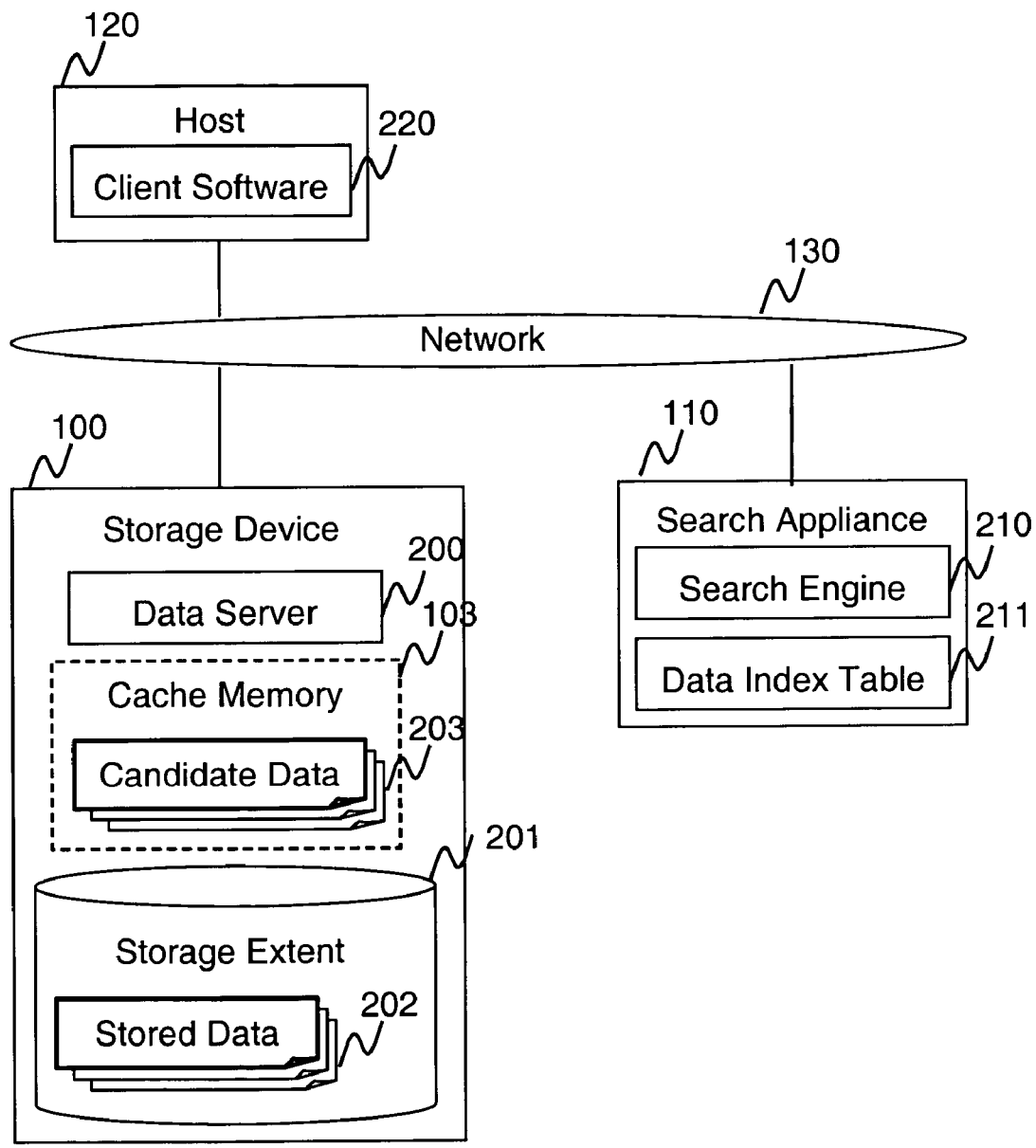

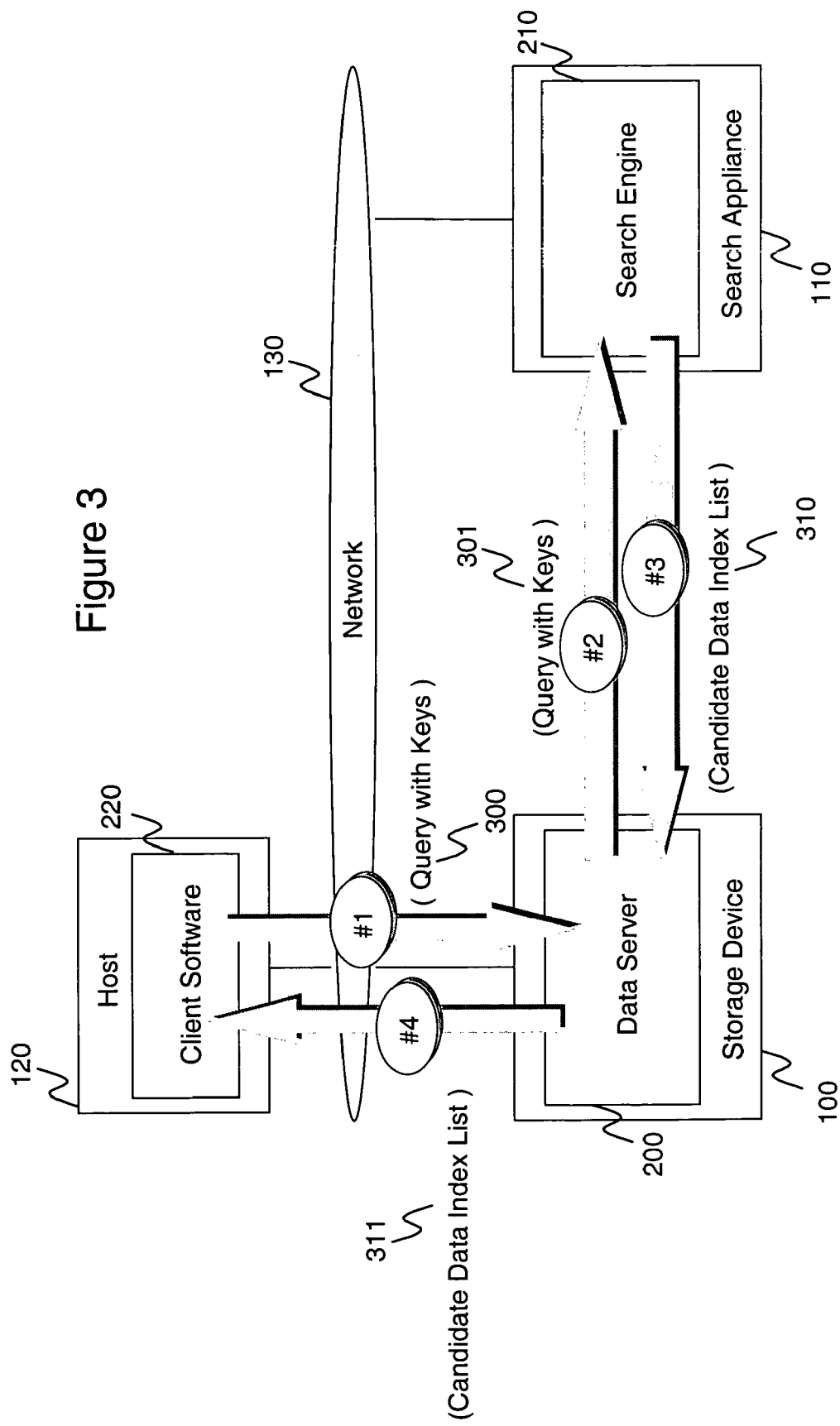

Figure 4

| DataID | Name | Description | Keys | ... |
|---|---|---|---|---|
| D0001 | Road Runner | "I'm a road runner honey And you can't keep up with me Well I'm a road runner lover.." | "Sep.15.2010, 23:01:01", "Aerosmith", "Honkin' On Bobo", "Road Runner", "Rock", ... | |
| D0002 | Baby Please Don't Go | "A baby please don't go Baby please don't go Yeeeaaahhh..." | "Sep.15.2010, 23:05:32", "Aerosmith", "Honkin' On Bobo", "Baby Please Don't Go", "Rock", ... | |
| D0003 | Don't Know Why | "I waited' til saw the sun I don't know why I didn't come I left you be the house of fun.." | "Oct.02.2010, 22:46:15", "Norah Jones", "come away with me", "Don't Know Why", "Jazz", ... | |
| D0004 | Seven Years | "Spinning, laughing, dancing to her favorite song A little girl with nothing.." | "Oct.02.2010, 22:46:15", "Norah Jones", "come away with me", "Don't Know Why", "Jazz", ... | |
| ... | ... | ... | ... | |

2100 — DataID
2110 — Name
2120 — Description
2130 — Keys
2101, 2102, 2103, 2104

Figure 13

| | 32100 | 32110 | 32120 | |
|---|---|---|---|---|
| | DataID | StorageExtentID | Powered | |
| 32101 | D0001 | E100 | ON | |
| 32102 | D0002 | E200 | OFF | |
| 32103 | D0003 | E300 | OFF | |
| 32104 | D0004 | E400 | OFF | |
| | ... | ... | | |

Figure 19

| DataID | StorageExtentID | Name | Description | Keys | |
|---|---|---|---|---|---|
| D0001 | E100 | Road Runner | "I'm a road runner honey. And you can't keep up with me. Well I'm a road runner lover..." | "Sep.15.2010, 23:01:01", "Aerosmith", "Honkin 'On Bobo", "Road Runner", "Rock", ... | |
| D0002 | E100 | Baby Please Don t Go | "A baby please don't go. Baby please don't go. Yeeeaaahhh..." | "Sep.15.2010, 23:05:32", "Aerosmith", "Honkin 'On Bobo", "Baby Please Don t Go", "Rock", ... | |
| D0003 | E200 | Don t Know Why | "I waited til saw the sun. I don t know why I didn t come. I left you be the house of fun..." | "Oct.02.2010, 22:46:15", "Norah Jones", "come away with me", "Don t Know Why", "Jazz", ... | |
| D0004 | E200 | Seven Years | "Spinning, laughing, dancing to her favorite song. A little girl with nothing..." | "Oct.02.2010, 22:46:15", "Norah Jones", "come away with me", "Don t Know Why", "Jazz", ... | |
| ... | | ... | | | ... | ance of the data retrieval operation, the corresponding data is placed in a cache memory having a short response time. Existing caching systems use various methods to determine which data should be cached. Those methods include, for example, caching data which was previously accessed, caching the most recently accessed data, caching data related to previously retrieved data, and caching construction data of previously requested data. For example, there exist systems which cache a previously requested file. Additionally, certain database management systems employ caching of a data block corresponding to previously read records.

APPARATUS AND METHOD FOR QUICK RETRIEVAL OF SEARCH DATA BY PRE-FETECHING ACTUAL DATA CORRESPONDING TO SEARCH CANDIDATE INTO CACHE MEMORY

FIELD OF THE INVENTION

The present invention generally relates to computer storage systems and, more specifically, to a computerized data search and retrieval system.

DESCRIPTION OF THE RELATED ART

The amount of fixed content required to be stored in various forms of storage devices is constantly increasing due to, for example, necessity for regulatory compliance. Because the amount of stored data may be very large, it may be impossible for a human to manage. This trend will become more apparent in the near future. Therefore, various automated means for searching and retrieving data from various high capacity storage devices will be in demand.

On the other hand, various kinds of specialized data operations such as searching, encrypting or compressing are increasingly implemented using special-purpose appliances, instead of incorporating the corresponding functionality into the storage device itself. Thus, storage vendors increasingly focus on the capabilities of the data storage function, while search vendors, for example, concentrate on delivering high performance search appliances. The search appliances can be incorporated into the storage systems using suitable interfaces, which would enable the users to use the search function as if it has been internally implemented by the storage device.

It should be noted that, generally, during a data searching operation, the actual data constituting the results of the search is not viewed by the user immediately. The user usually continuously browses through the results of the search provided to him or her in a form of a list or a table and periodically requests to view only certain selected results. On the other hand, the user usually requires rapid retrieval of the specific search results, which are selected by the user for viewing. Therefore, solutions enabling quicker retrieving of actual data corresponding to results of a search will be demanded by users.

Generally, to increase the speed of the data retrieval operation, the corresponding data is placed in a cache memory having a short response time. Existing caching systems use various methods to determine which data should be cached. Those methods include, for example, caching data which was previously accessed, caching the most recently accessed data, caching data related to previously retrieved data, and caching construction data of previously requested data. For example, there exist systems which cache a previously requested file. Additionally, certain database management systems employ caching of a data block corresponding to previously read records.

However, the conventional systems fail to provide a solution for shortening data retrieval times of the results of a search, especially in storage systems implemented using a search appliance or in large storage systems assembled using multiple external storage devices. Therefore, what is needed is a system capable of shortening time for retrieving data corresponding to search results returned, for example, by a search engine.

SUMMARY OF THE INVENTION

The inventive methodology is directed to methods and systems that substantially obviate one or more of the above and other problems associated with searching and retrieving of data.

One aspect of the inventive concept is a computerized system for searching data. The inventive system includes a client host executing a client software operable to compose a search query in response to a user request. The inventive system also includes a storage device including a cache memory. The storage device is operable to receive the search query from the client host. The inventive further includes a data search appliance operable to receive a search query from the storage device and invoke a search process to find search candidates. Upon the completion of the search process, the search appliance returns the search candidate information to the storage device, which passes the search candidate information to the client host and pre-fetches actual data corresponding the search candidate information into its cache memory.

Another aspect of the inventive concept is a computerized system for searching data. The inventive system includes a client host executing a client software operable to compose a search query in response to a user request. The inventive system also includes a data search appliance which receives a search query from the client host and invokes a search process to find search candidates. Upon the completion of the search process, the search appliance returns the search candidate information to the client host. The inventive further includes a storage device having a cache memory and a storage extent. The data search appliance provides the search candidate information to the storage device, which pre-fetch actual data corresponding the search candidate information into its cache memory.

Yet another aspect of the inventive concept is a method and a computer programming product embodying computer-executable instructions for performing a method for searching data. In accordance with the inventive method, a search query is received from a client. Upon the receipt of the query, a search process is invoked to search stored data for search candidates matching the search query and to produce search candidate information. After that, search candidate information is returned to the client and the actual data corresponding the search candidate information is pre-fetched into a cache memory.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 2 illustrates an exemplary embodiment of a logical element structure in accordance with the first embodiment of the inventive concept.

FIG. 3 illustrates an exemplary embodiment of a search request and response path.

FIG. 4 illustrates an exemplary embodiment of a data structure of the Data Index Table.

FIG. 13 illustrates an exemplary embodiment of a data structure of the Data Location Table.

FIG. 19 illustrates an exemplary embodiment of a data structure of the Data Index Table.

DETAILED DESCRIPTION

Figure 1:
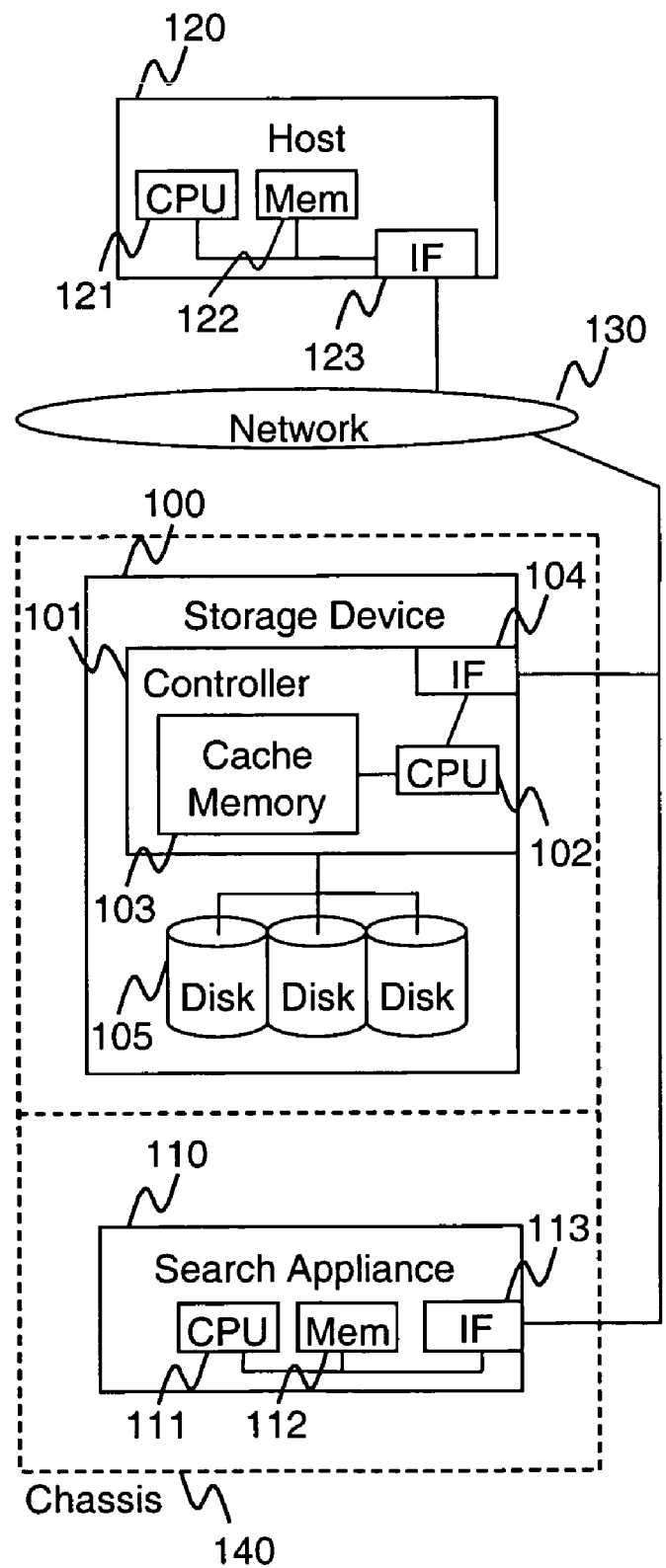
FIG. 1 illustrates an exemplary embodiment of a hardware architecture in accordance with the first embodiment of the inventive concept.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

The storage system in accordance with an embodiment of the inventive concept includes a client host, a storage device, and a separate data search appliance. The client software executing on the client host creates query and sends a data search request to the storage device. The storage device passes the received query to the connected data search appliance.

The search appliance invokes search process to find search candidates using meta information of the data stored in the storage device. Upon the completion of the search process, the search appliance returns the identified search results to the storage device. Upon receipt of the search results from the search appliance, the storage device passes them to the client. At the same time, the storage device pre-fetches the actual data which corresponds to the search results into its cache memory to ensure fast future retrieval.

When the client requests to retrieve actual data corresponding to any of the search results from the storage device, the storage device returns the desired data immediately from its cache memory. If the client requests to retrieve additional data corresponding to another search result, these data is returned immediately as well.

Because in the described system configuration the aforementioned searching functionality is invoked in response to an instruction from the storage device, the storage device and its interface constitutes a consolidated entry point of all data operations within the system, including searching of the storage device. Therefore, each search operation request goes through the storage device. Therefore, in accordance with an aspect of the inventive concept, the described storage system architecture and its features are used to pre-fetch in advance the data, which is expected to be retrieved by the client.

An aspect of the inventive concept is focused not only on pre-fetching of any specific type of data, but on pre-fetching of any search candidates returned by the search process every time the search is performed. Furthermore, another aspect of the inventive concept provides methods of shortening data retrieving times for hierarchal structured storage system by pre-fetching data from externally attached storage to the front end storage cache memory. Accordance with another aspect of the invention, the system initiates the rotation of storage media storing the relevant data when the storage devices were previously turned off to reduce the power consumption.

The first embodiment of the inventive system will now be described. FIG. 1 shows an example of physical hardware architecture of this embodiment. The inventive data search and retrieval system includes Storage Device 100, Search Appliance 110, and Host 120. These components are interconnected by the Network 130. The Network 130 may be fiber channel and/or IP network. However, as would be appreciated by those of skill in the art, the exact nature of the Network 130 is not essential to the concept of this invention. Therefore, any other suitable network system may be used. In accordance with an embodiment of the inventive system, Storage Device 100 and Search Appliance 110 are mounted on the same Chassis 140. For example, the Search Appliance 110 may be implemented as a plug-in module of the Storage Device 100. However, any other hardware configuration may be used as well.

The Storage Device 100 includes a set of Disks 105 connected to the Controller 101. The Controller 101 includes central processing unit (CPU) 102, Cache Memory 103 and Network Interface 104 for coupling the Controller to the Network 130. The Storage Device 100 is connected to the Search Appliance 110 and the Host 120 through the Network 130.

The Search Appliance 110 will now be described. In an embodiment of the invention, the Search Appliance 110 is a specialized device for searching data stored in the attached Storage Device 100 based on the specified search criteria. The Search Appliance comprises a CPU 111, Memory 112, and Network Interface 113. The Search Appliance is connected through Network 130 to the Storage Device 100 for accessing the data stored therein as well as for receiving the data search requests and transmitting the appropriate responses.

In an embodiment of the inventive system, the Host 120 may be implemented as a generic computer system, which may include a CPU 121, a Memory 122, and a Network Interface 123. The Host 120 is coupled through the Network 130 to Storage Device 100 for searching and retrieving specific data.

FIG. 2 shows various software modules as well as logical object structure of the first embodiment of the inventive system. With reference to FIG. 2, Storage Device 100 includes Data Server 200, Cache Memory 103 and Storage Extent 201.

The Data Server 200 is a service program, which enables the Client Software 220 to perform general data manipulations, such as storing and retrieving. In accordance with an embodiment of the inventive concept, the Data Server 200 is an entry point of the data search functionality of the inventive system. The Data Server 200 communicates with Search Engine 210 of the Search Appliance to request a data search and obtain the results.

Storage Extent 201 may consist of one or more physical Disks and it is accessible by the Client Software 220 through Network 130. The Storage Extent 201 provides data storage capacity to the inventive system.

Stored Data 202 is actual data that specified from Client Software 220 to store in the Storage Device. It might be variety type of data such as music, video, computer aided design (CAD), and so on. It is placed in the Storage Extent 201.

Candidate Data 203 is actual data that copied from Storage Extent 201 onto the Cache Memory according to the search result which to be ready for retrieving from Client Software 220.

The elements of the Search Appliance 110 will now be described. The Search Engine 210 is a program to select candidate data based on the specified search keys. The Search Engine 210 doesn't actually seek the data in the Storage Device but it will find the candidates by using Data Index Table 211 in which meta information of stored data is listed and placed at the Search Appliance instead of Storage Device.

Data Index Table 211 holds the meta information of the data stored in Storage Device. It is used and managed by the Search Engine 210.

Various elements of the Host 120 will now be described. Client Software 220 is the program requesting data operations to the Storage Device such as storing, retrieving, and also searching specific data.

FIG. 3 shows how the search request and its response will be sent in this embodiment. Because the Data Server is presented as a single entry point of whole data operation, Client Software sends Query with Keys 300 to the Data Server (#1) on the Storage Device instead of to the Search Engine on the Search Appliance directly. Then, the Data Server forwards Query and Keys 301 to the Search Engine (#2) on the Search Appliance. After Search Engine has selected candidates it returns Candidate Data Index List 310 to the Data Server (#3). It would be a subset data of Data Index Table which holds the meta information of data described below. At last, Data Server forwards the Candidate Data Index List 311 to the Client Software (#4) as a return of search request.

FIG. 3 illustrates the fact that from the point of view of the client, all the entry points into the system concentrate with the Data Server 200, while the Search Engine 210 is implemented as an internal module, which the client can not see directly. This is the reason why the search request and response paths are as shown in the FIG. 3.

The data structures used by the embodiment of the inventive concept will now be described. FIG. 4 illustrates an exemplary embodiment of data structure of the Data Index Table. The Data Index Table includes the following columns: the DataID column 2100 contains identification of the Stored Data; the Name column 2110 contains a characters string specifying the name of the Stored Data; the Description column 2120 contains a characters string specifying the description of the Stored Data; and the Keys column 2130 contains search keys of the Stored Data. The stored keys may include, without limitation, an attribute, role, or belonging of the data.

For instance, row 2101 of the Data Index Table shown in FIG. 4 represents a record of a music title 'Road Runner'. This record has Stored Data identification 'D001', name 'Road Runner' (a title of the music). The Description column 2120 specifies a portion of the song's lyrics, while the Keys column 2130 contains the record creation time, artist name, name of compact disk (CD), name of the song, the music category, etc.

The Data Index Table is managed by Search Engine to store meta information of data stored in the Storage Device. This table is used by the Search Engine 210 for the purpose of facilitating the search for candidates.

Figure 5:
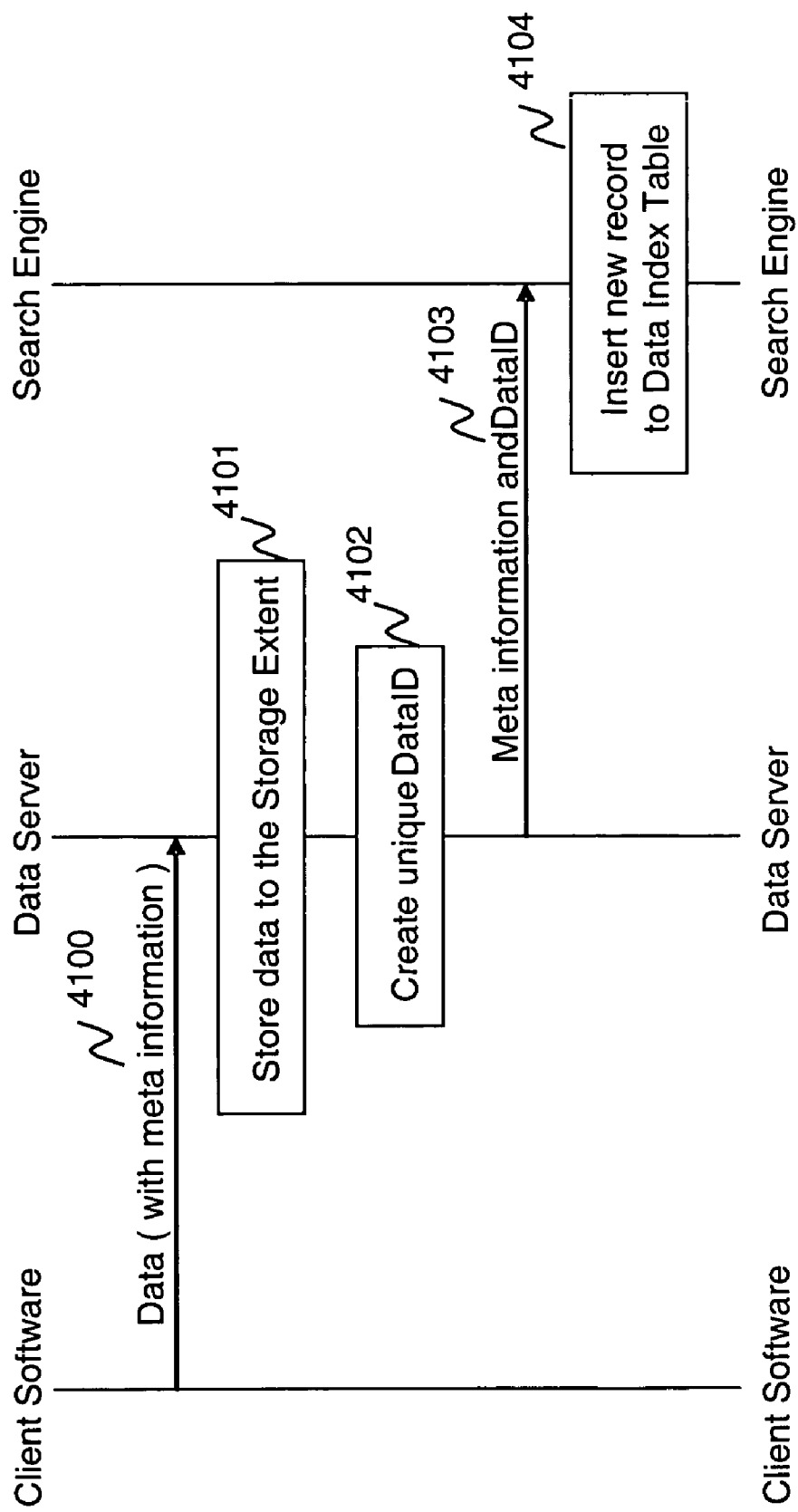
FIG. 5 illustrates an exemplary embodiment of a process for storing data (creating index).
Figure 6:
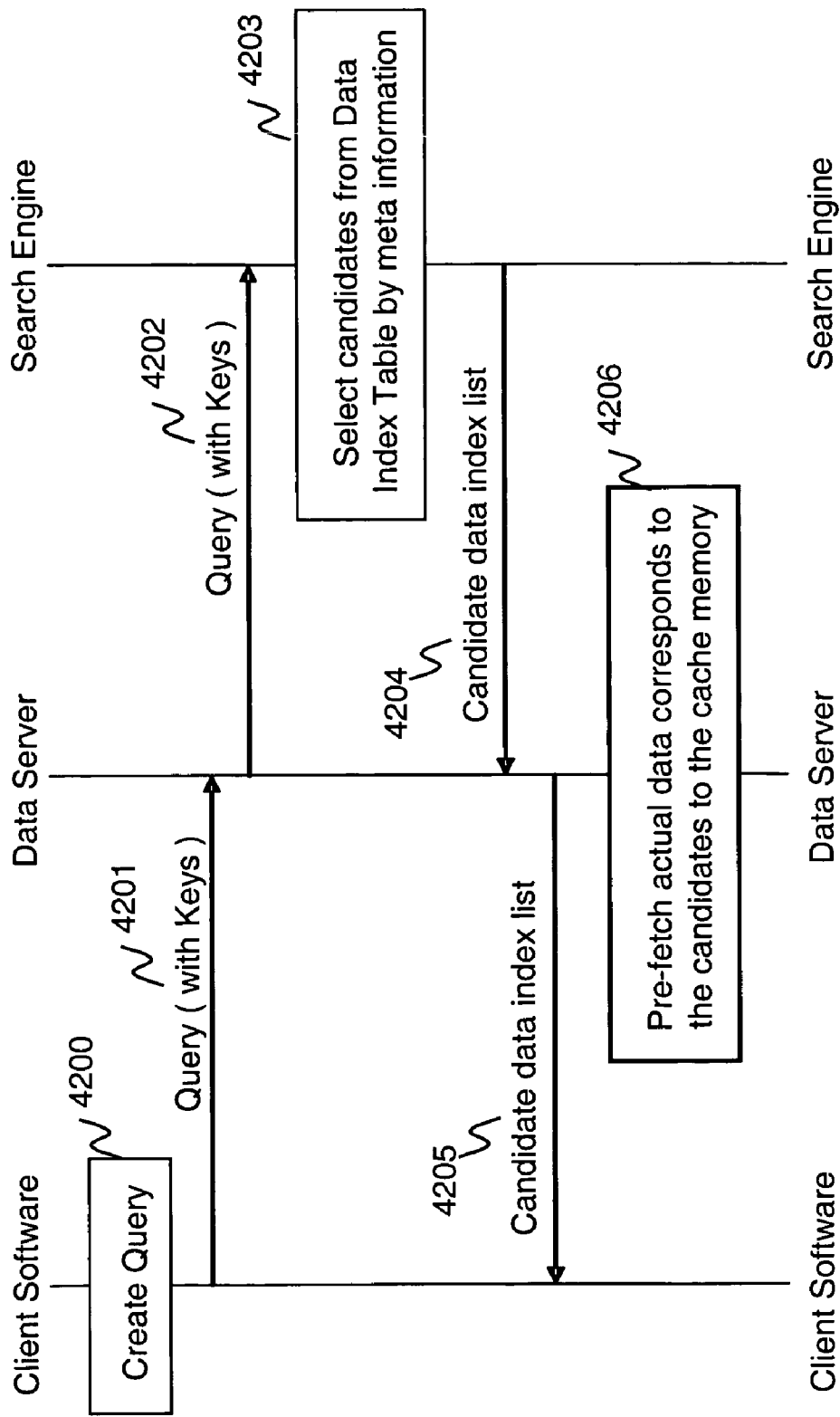
FIG. 6 illustrates an exemplary embodiment of a process for searching data.
Figure 7:
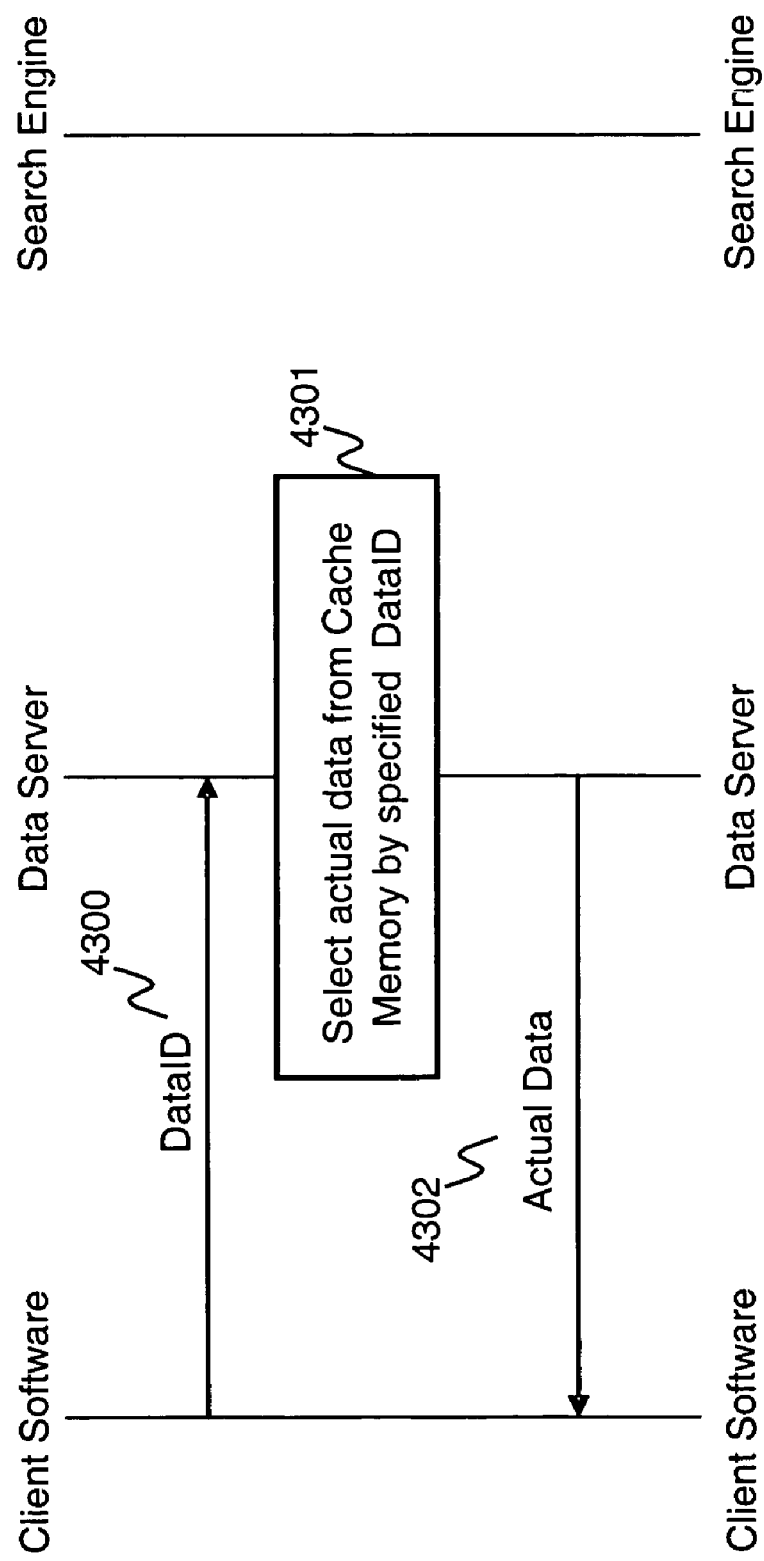
FIG. 7 illustrates an exemplary embodiment of a process for retrieving data.

The process flow associated with the first embodiment of the inventive system will now be described with reference to FIGS. 5, 6 and 7.

First, an exemplary process for storing data (creating index) will be described with reference to FIG. 5. FIG. 5 shows an exemplary process for storing new data on Storage Device and creating its index data on Search Appliance. Specifically, at step 4100, the client Software sends to the Data Server new data to be stored, together with its meta information. At step 4101, the Data Server stores received data in the Storage Extent. At step 4102, the Data Server creates a unique DataID for Stored Data. At step 4103, the Data Server sends the meta information and the created DataID of the Stored Data to the Search Engine. Finally, at step 4104, the Search Engine creates a new record containing the received information into the Data Index Table.

Now, an exemplary embodiment of an inventive process for searching data will be described. FIG. 6 illustrates an exemplary process for searching data candidates in response to the request from the Client Software. Specifically, at step 4200, the Client Software creates a query statement containing meta information relating to the target data. At step 4201, the Client Software sends the created query to the Data Server. At step 4202, the Data Server forwards the received query to the Search Engine. At step 4203, the Search Engine selects data candidates from the Data Index Table using the specified meta information. Various methods for performing the search operation are well known in the art and are not essential to the concept of this invention.

At step 4204, the Search Engine returns the found candidates. The candidate set would be a subset of the Data Index Table. At step 4205, the Data Server forwards the received results to the Client Software. Finally, at step 4206, the Data Server pre-fetches the actual data which corresponds to the every received candidate from the Storage Extent onto the Cache Memory.

Now, the inventive algorithm for Retrieving Data will be described in detail. FIG. 7 shows an exemplary embodiment of a process for retrieving actual data from the Storage Device. At step 4300, the client Software sends the DataID of the desired Candidate Data to be retrieved, which is selected from the search results that were previously received during the search process. At step 4301, the Data Server selects a Candidate Data from the Cache Memory using the specified DataID. Finally, at step 4302, the Data Server returns the Candidate Data selected in step 4301.

The second embodiment of the inventive system will now be described. The second embodiment exemplifies the inventive concept with reference to a configuration, wherein the Search Engine functionality is embedded within the Storage Device, instead of a separated Search Appliance.

Most of the components and operating sequences of the second embodiment are the same as those described with reference to the first embodiment. Therefore, in the below description, only the respective differences will be explained.

Figure 8:
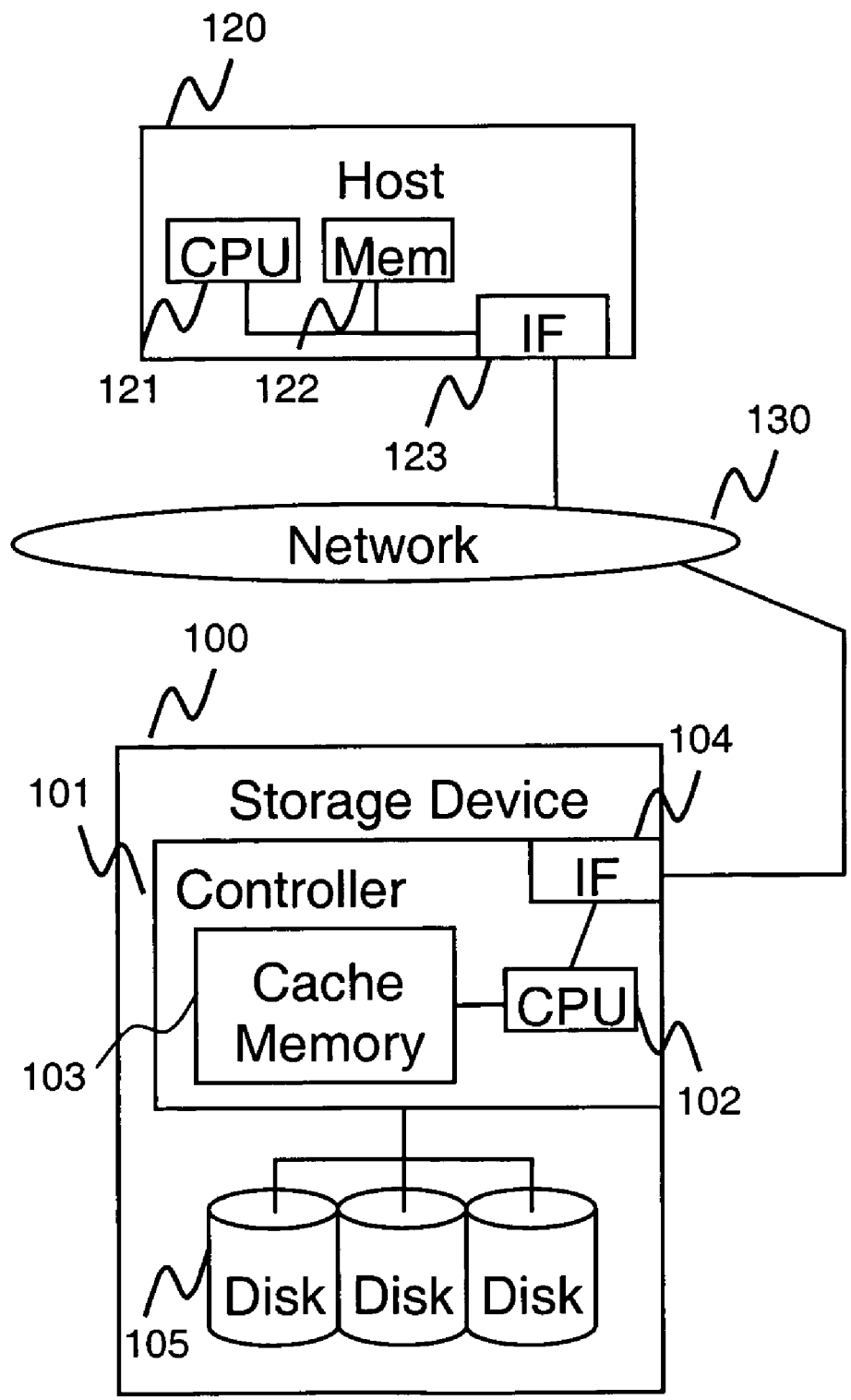
FIG. 8 illustrates an exemplary hardware architecture in accordance with the second embodiment of the inventive concept.

First, the hardware architecture will be explained with reference to FIG. 8. FIG. 8 shows an exemplary hardware architecture of a system in accordance with this embodiment. The shown configuration does not have an independent Search Appliance because the logical elements enabling the search process are incorporated into Storage Device 100. Each of the components of the Storage Device 100 and Host 120 is same as the corresponding component of the respective subsystem of the first embodiment shown in FIG. 1.

Figure 9:
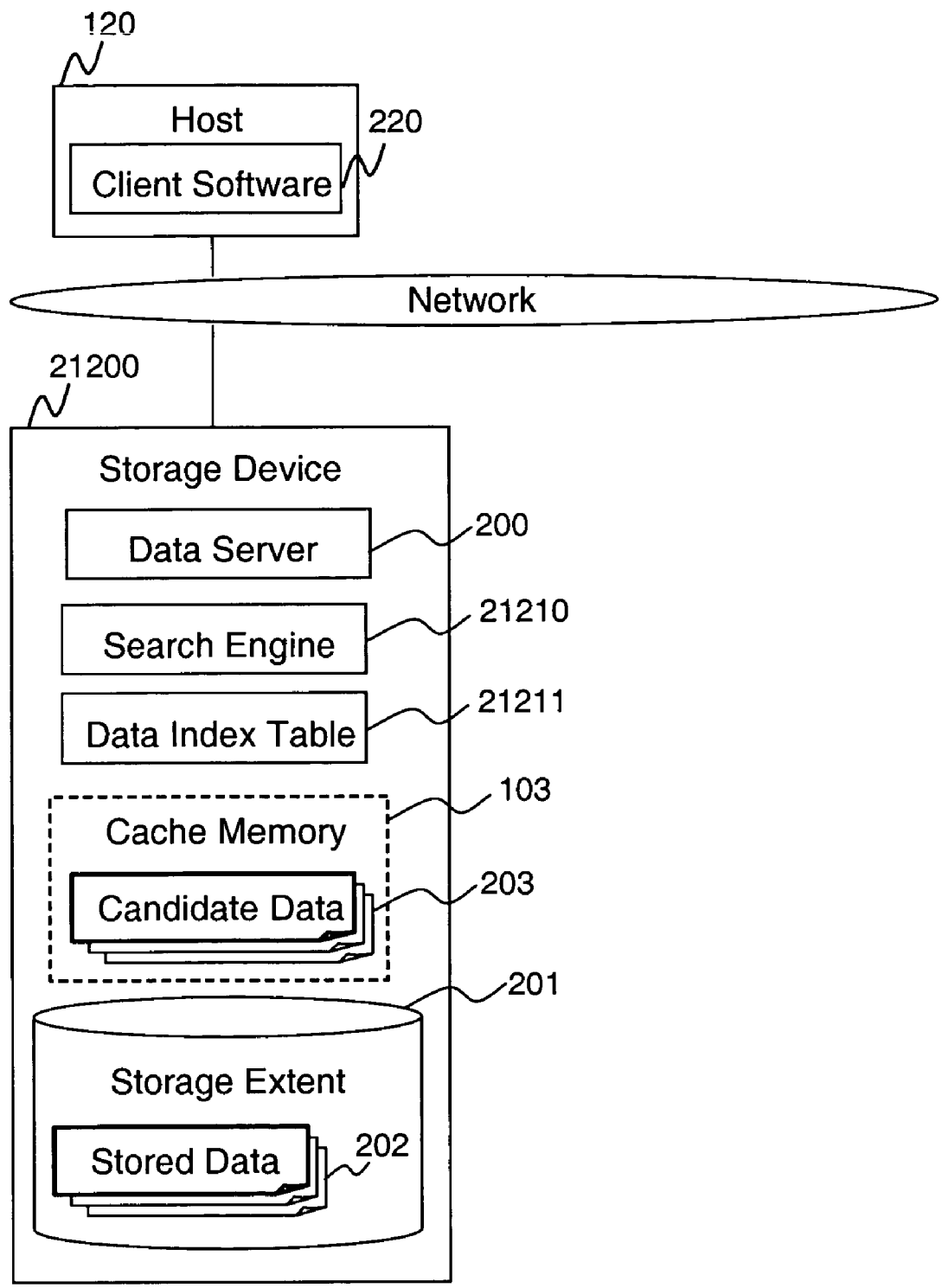
FIG. 9 illustrates an exemplary logical element structure in accordance with the second embodiment of the inventive concept.

The logical element structure of the second embodiment will now be described with reference to FIG. 9. Specifically, FIG. 9 shows software and logical object structure of the second embodiment. The Storage Device 21200 includes the Data Server 200, the Storage Extent 201, the Stored Data 202, and the Candidate Data 203, which are the same as the corresponding elements of the first embodiment shown in FIG. 2. In the second embodiment, the Search Engine 21210 and Data Index Table 21211 are embedded into the Storage Device 21200 and interoperate with the Data Server 200 internally. The operating sequence of the Search Engine 21210 as well as the data structure of Data Index Table 21211 are the same as described above with reference to the first embodiment, except that in the first embodiment, the Search Engine 21210 as well as the Data Index Table 21211 were the components of the Search Appliance.

Figure 10:
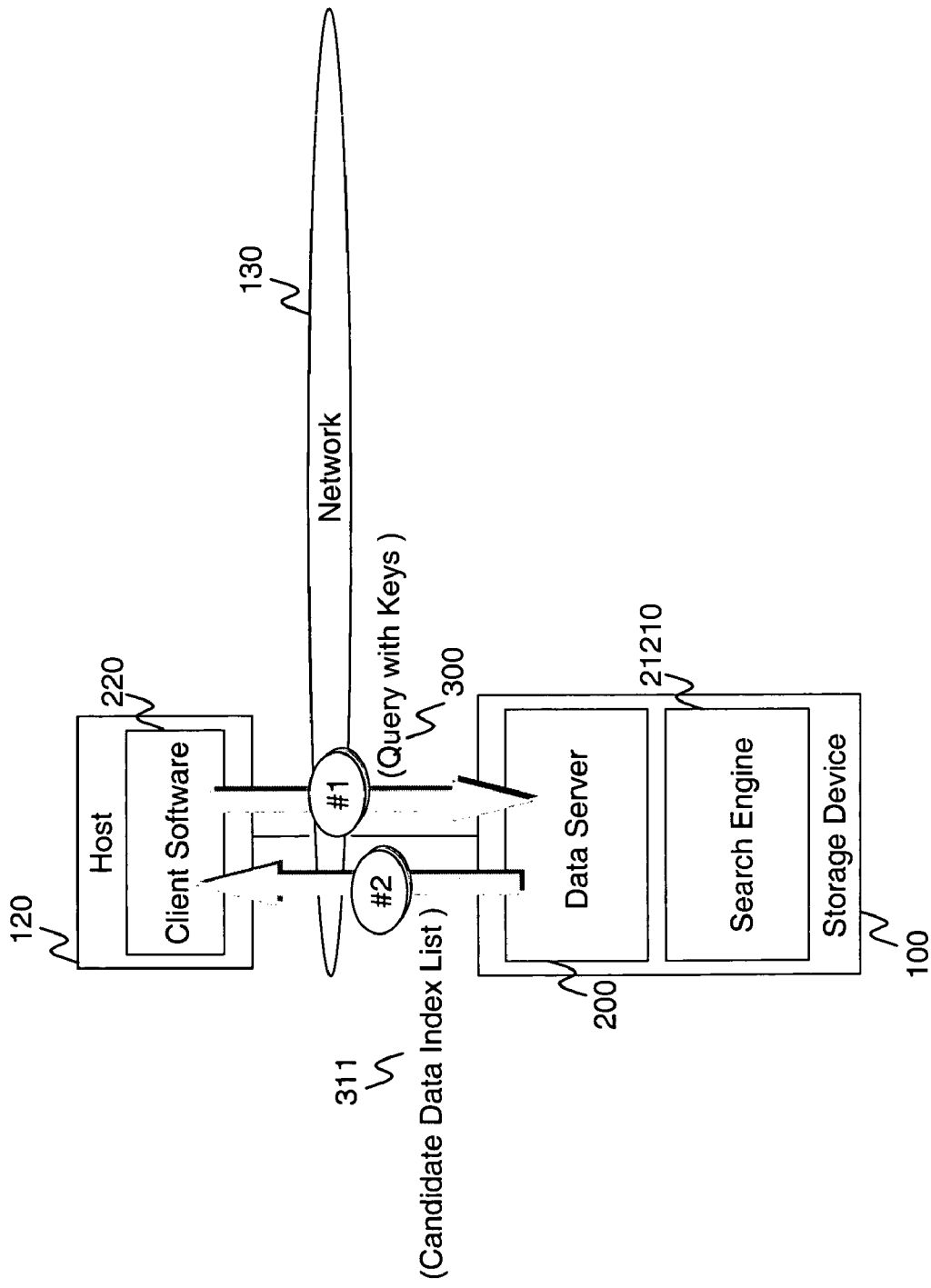
FIG. 10 illustrates an exemplary search request and response path.

The Client Software 220 executing on the Host 120 is same as the Client software of the first embodiment shown in FIG. 2. FIG. 10 illustrates the manner in which the search request and the response thereto are sent in this embodiment of the invention.

In this embodiment, the Search Engine 21210 is embedded within the Storage Device 21200. Therefore, all the transactions between the Data Server 200 and Search Engine 21210 such as Query with Keys 301 or requests involving the Candidate Data Index List 310 shown in FIG. 3, with reference to the first embodiment of the invention, will now be done internally.

The other elements of the second embodiment, including the data structure and the process flows are the same as those of the first embodiment, which were described in detail above.

The third embodiment of the inventive system will now be described. The third embodiment exemplifies the inventive concept in a configuration wherein multiple external storage devices are attached to the front end storage unit. Such a configuration may be used, for example, to construct a virtual storage system with very high storage capacity characteristics. This embodiment of the inventive system provides means for speeding up the retrieval of actual data corresponding to the search results in systems having the aforementioned storage system architecture.

Most of the components and modes of operation of the system in accordance with this embodiment are the same as those of the first embodiment. Therefore, only the differences will be described below.

Figure 11:
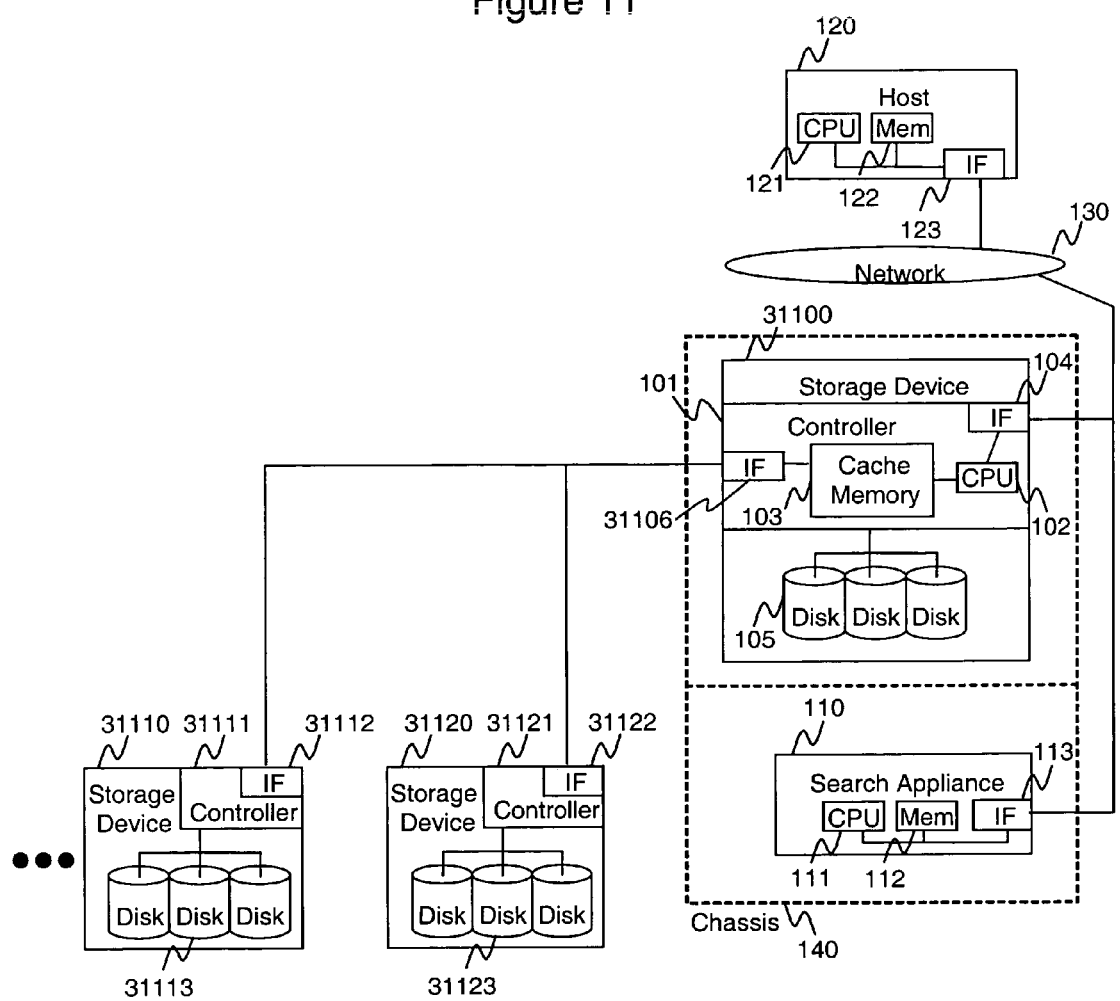
FIG. 11 illustrates an exemplary embodiment of a hardware architecture in accordance with the third embodiment of the inventive concept.

First, the hardware architecture will be explained with reference to FIG. 11. FIG. 11 illustrates an exemplary hardware architecture in accordance with this embodiment. The system shown in FIG. 11 includes multiple external Storage Devices 31110, 31120, in addition to the system components described in FIG. 1, which depicts the system of the first embodiment. Additional Storage Devices 31110, 31120 are attached to the backend interface of the front end Storage Device 31100. Components of the Search Appliance 110 and the Host 120 are same as the corresponding elements shown in FIG. 1.

The Front End Storage Device 31100 will now be described. Most of the components of the Front End Storage Device 31100 are the same as the corresponding components of the Storage Device 100 of the first embodiment. However, the Controller of the Storage Device 31100 includes a Backend Network Interface 31106. The Back End Network Interface 31106 enables the external Storage Devices 31110 and 31120 to connect to the Front End Storage Device 31100, thereby enabling the aforementioned large storage capacity virtual Storage Device. To facilitate the high-performance virtual storage system, it may be desirable to use a Front End Storage Device having improved performance characteristics.

Now, the External Storage Devices 31110 and 31120 will be described in detail. In one embodiment of the inventive storage system, these devices are of modular type and can be used for expanding the data storing capacity of aggregate virtual storage system. The External Storage Devices 31110 and 31120 may include a similar set of internal elements as the Front End Storage Device 31100. The External Storage Devices 31110 and 31120 are attached to the Backend Network Interface 31106 of Front End Storage Device 31100.

Figure 12:
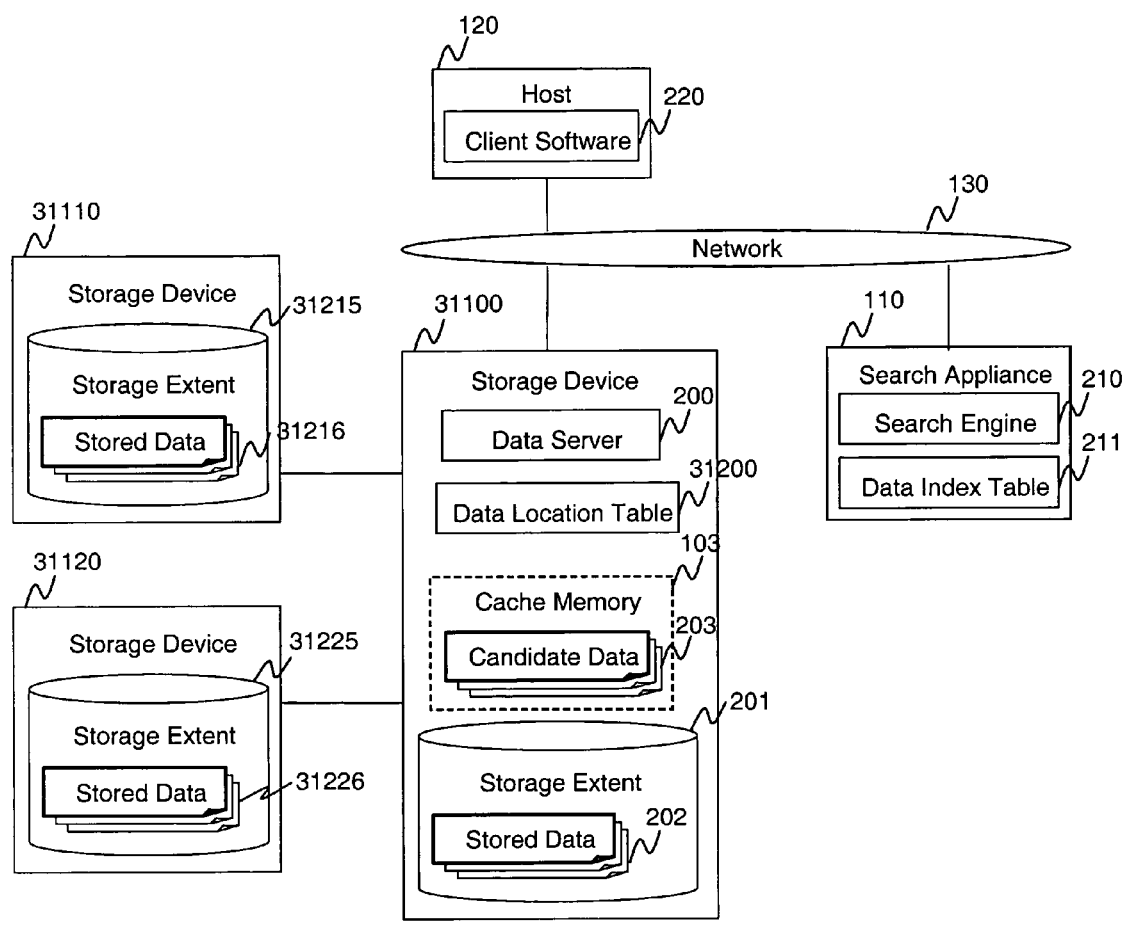
FIG. 12 illustrates an exemplary embodiment of a logical element structure in accordance with the third embodiment of the inventive concept.

The logical element structure of the third embodiment of the inventive system will now be described with reference to FIG. 12. Specifically, FIG. 12 shows software and logical object structure of this embodiment. Elements of the Search Appliance 110 and Host 120 are same as those shown in FIG. 2 with reference to the first embodiment of the invention.

The Front End Storage Device 31100 shown in FIG. 12 includes Data Server 200, Storage Extent 201, Stored Data 202, and Candidate Data 203, which are the same as the corresponding elements of the first embodiment shown in FIG. 2. In addition to those elements, the Front End Storage Device of the third embodiment includes a Data Location Table 31200, which holds the location information for each stored unit of data. The location information may include the Storage Extent identifier pointing to the external Storage Device.

The External Storage Devices 31110 and 31120 include Storage Extents 31215 and 31225, which are similar to the Storage Extent 201 of the Front End Storage Device 31100. These Storage Extents hold the Stored Data 31216 and 31226 which are the actual data stored pursuant to the appropriate storage request from the Client Software 220. The Stored Data 31216 and 31226 are written into the respective Storage Extent by the Data Server 200 of the Front End Storage Device.

The Data Structure of the third embodiment of the inventive system will now be described with reference to FIG. 13. Specifically, FIG. 13 shows an exemplary data structure of the Data Location Table 31200. The DataID column 32100 of the Data Location Table stores the identification information on the Stored Data. The StorageExtentID column 32110 contains information identifying the specific Storage Extent where the corresponding data is stored. In particular, the Storage Extent identifier has a value, which is unique in the entire storage system including the external Storage Devices. This value is allocated by Data Server and may include the identification code of the respective Storage Device.

The Powered column 32120 indicates whether a storage device(s), such as a hard disk drive, corresponding to the Storage Extent, is powered on or is in the stand-by mode for the power consumption saving reason.

For instance, row 32101 represents a record corresponding to a Stored Data with identification 'D001', stored at a Storage Extent 'E100', which is located on a device that is powered ON at the moment. Because the 'Powered' status is dynamic, each Storage Device needs to promptly report the changes in the power status of each Storage Extent to the Data Server.

The Data Location Table is managed by the Data Server, which keeps track of the location of the Stored Data in the entire storage system. This table is referenced when the inventive system processes pre-fetch of actual data during the search process.

Figure 14:
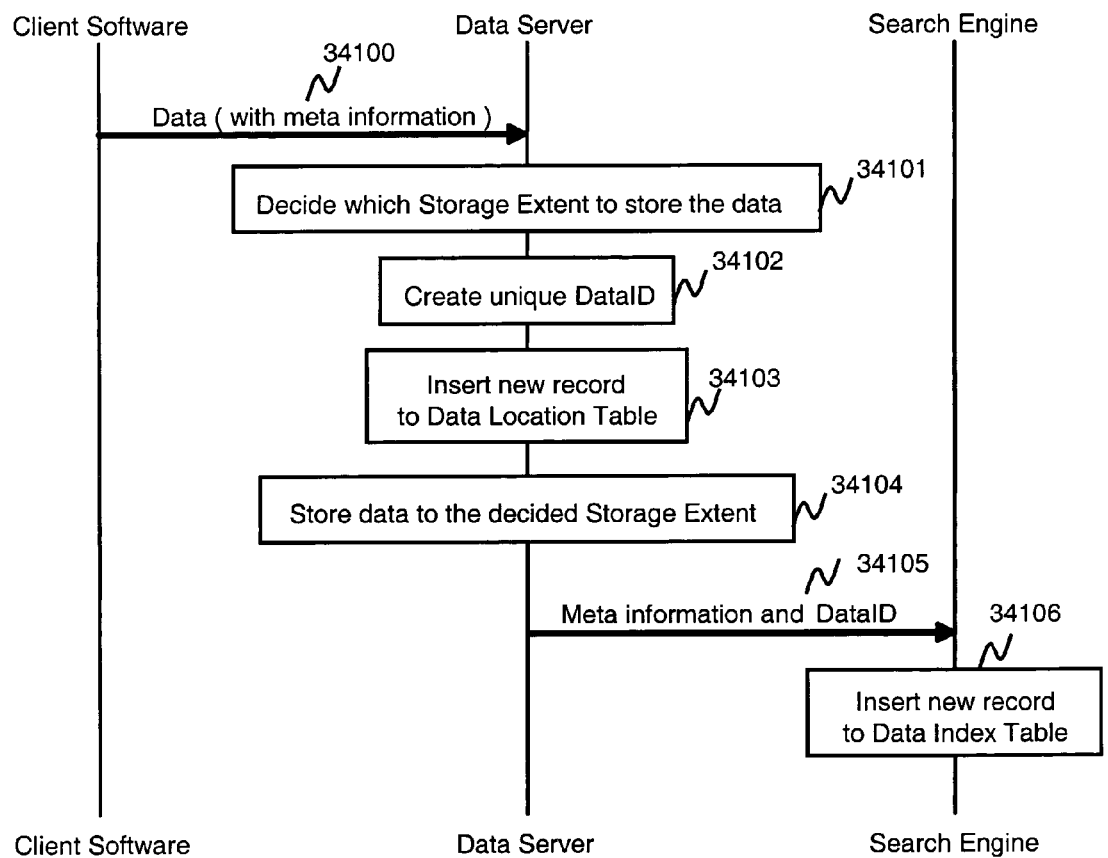
FIG. 14 illustrates an exemplary embodiment of a process of storing data (creating index).
Figure 15:
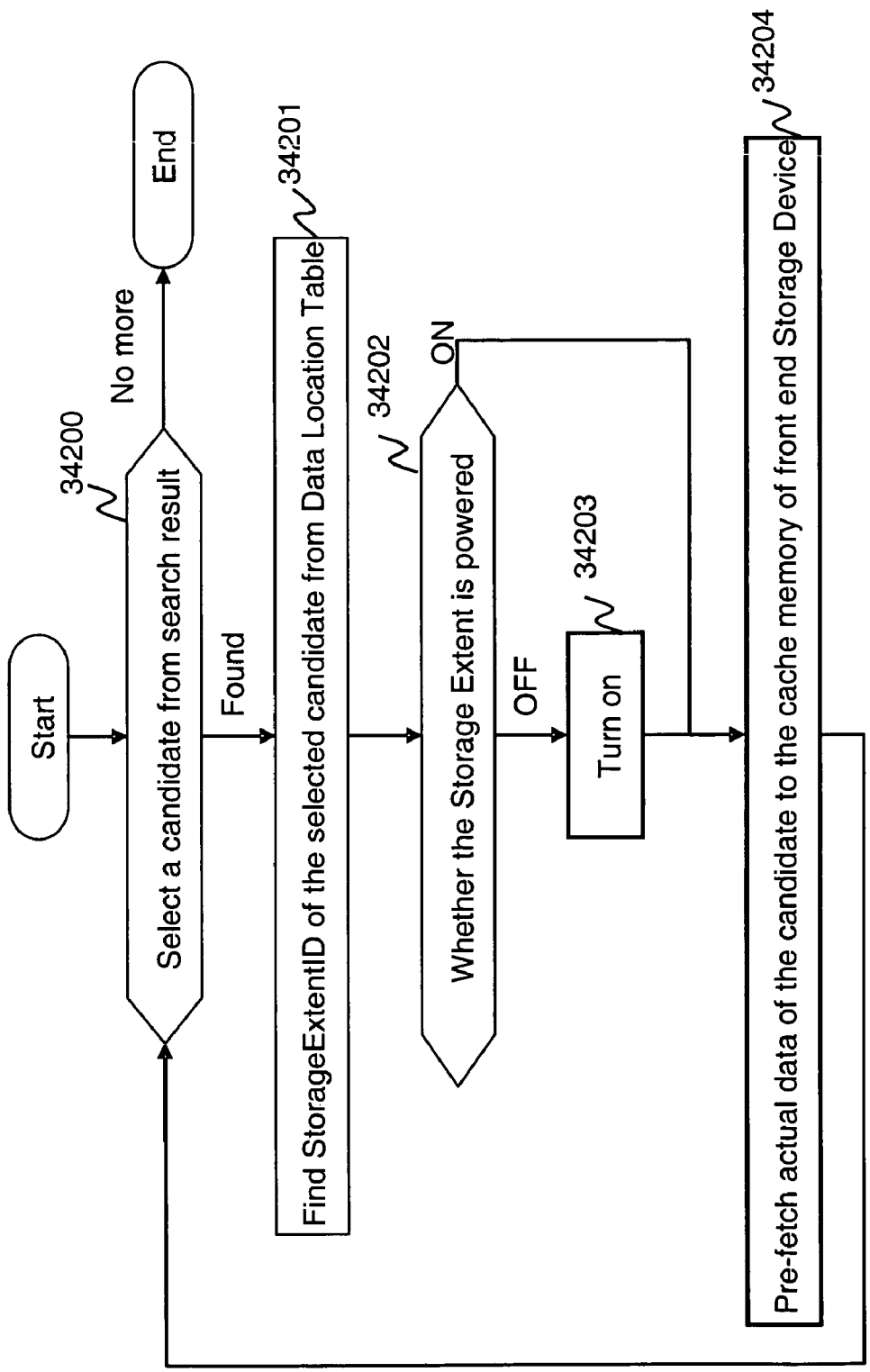
FIG. 15 illustrates an exemplary embodiment of a process of pre-fetching searched data.

Now, the process flow of the system of the third embodiment will be described with reference to FIGS. 14 and 15. FIG. 14 shows an example process of storing new data on either Storage Device, and creating the corresponding index data on Search Appliance. First, at step 34100, the Client Software sends to the Data-Server new data to be stored, together with the corresponding meta information.

At step 34101, the Data Server decides which Storage Extent, including the external Storage Device(s), should be used to store the received data. The details of the storage allocation method used by the Data Server are not essential to the concept of the present invention. Exemplary suitable methods include, without limitation, the round robin algorithm as well as algorithms which pick the storage device with the most free space and/or the highest access speed.

At step 34102, the Data Server creates a unique DataID for Stored Data. Subsequently, at step 34103, the Data Server creates a new record in the Data Location Table and inserts into this record the created DataID, the StorageExtentID of the chosen data storage location, as well as its powered status. It should be noted that the power status may not be set during the initial stage, but subsequently updated by each Storage Device when the power status changes.

At step 34104, the Data Server stores the received data to the chosen Storage Extent. At step 34105, the Data Server sends the meta information and the created DataID of the Stored Data to the Search Engine. At step 34106, the Search Engine creates a new record in the Data Index Table and populates it with the received information.

The process for pre-fetching of the Searched Data will now be described. Overall, the process for searching data in the system of the third embodiment is the same as the corresponding process of the first embodiment. However, the process for pre-fetching the searched results is specific to this embodiment. It should be noted that this pre-fetching process corresponds to the step 4206 of FIG. 6, which illustrates the first embodiment of the inventive system. FIG. 15 shows an exemplary embodiment of the pre-fetching process specific to the third embodiment of the invention. This process is executed by Data Server located on the Front End Storage Device.

In particular, steps 34200 to 34204 of this process execute in a loop until every candidate is pre-fetched. At step 34200, the Data Server selects a candidate from the search results, which are received from the Search Appliance. If the actual data corresponding to each candidate are pre-fetched to the Cache Memory, the process terminates. Otherwise, the process proceeds to step 34201.

At step 34201, the system finds StorageExtentID, which indicates the location of actual data corresponding to the search candidate selected at step 34200. The StorageExtentID is fetched from the Data Location Table using the DataID value of the candidate. At step 34202, the system determines whether the relevant Storage Extent is powered ON or if it is in the stand-by mode. In the latter case, the Storage Extent, or the related physical storage drives, are powered ON at step 34203. Otherwise, this step is skipped.

At step 34204, the actual data is retrieved from the Storage Extent and fetched into the Cache Memory. In an embodiment of the inventive system, the data is retrieved even if it is located on one of the external Storage Devices.

The fourth embodiment of the inventive system will now be described. The fourth embodiment exemplifies the use of the inventive concept with reference to the configuration wherein the search query is directly sent from the Client Software to Search Appliance and wherein a single Search Appliance services multiple Storage Devices. This embodiment implements a storage system architecture designed to provide the appropriate search results to each Storage Device for pre-fetching corresponding actual data into the Cache Memory.

Most of the components and operating sequences of the fourth embodiment are the same as those described with reference to the first embodiment. Therefore, in the below description, only the respective differences will be explained.

Figure 16:
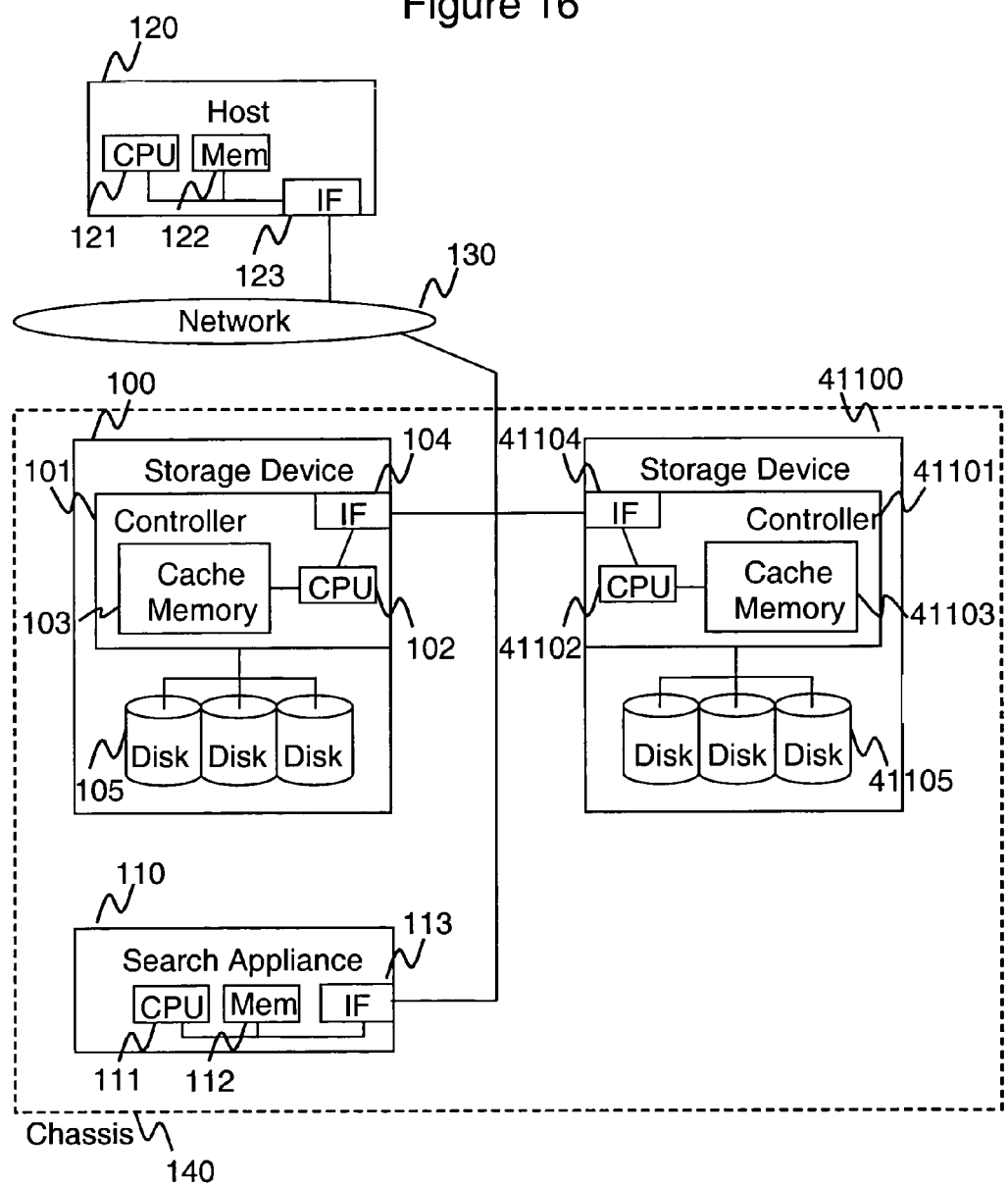
FIG. 16 illustrates an exemplary embodiment of a hardware architecture in accordance with the fourth embodiment of the inventive concept.

FIG. 16 shows an example of hardware architecture in accordance with the fourth embodiment of the invention. The system in accordance with the fourth embodiment includes another Storage Device 41 100, in addition to the system components shown in FIG. 1 of the embodiment. The additional Storage Device 41100 is connected to the other components of the inventive system via the Network 130. The components of the Storage Device 100, the Search Appliance 110 and the Host 120 are the same as the respective components of the corresponding units shown in FIG. 1 of the first embodiment.

The components of the additional Storage Device 41100 may be the same as the components of the Storage Device 100, which is described above with reference to the first embodiment. In one implementation, there are no specific differences of characteristics between each Storage Device.

Also, the various storage devices described herein may be physically located on the same Chassis 140 or separately.

Figure 17:
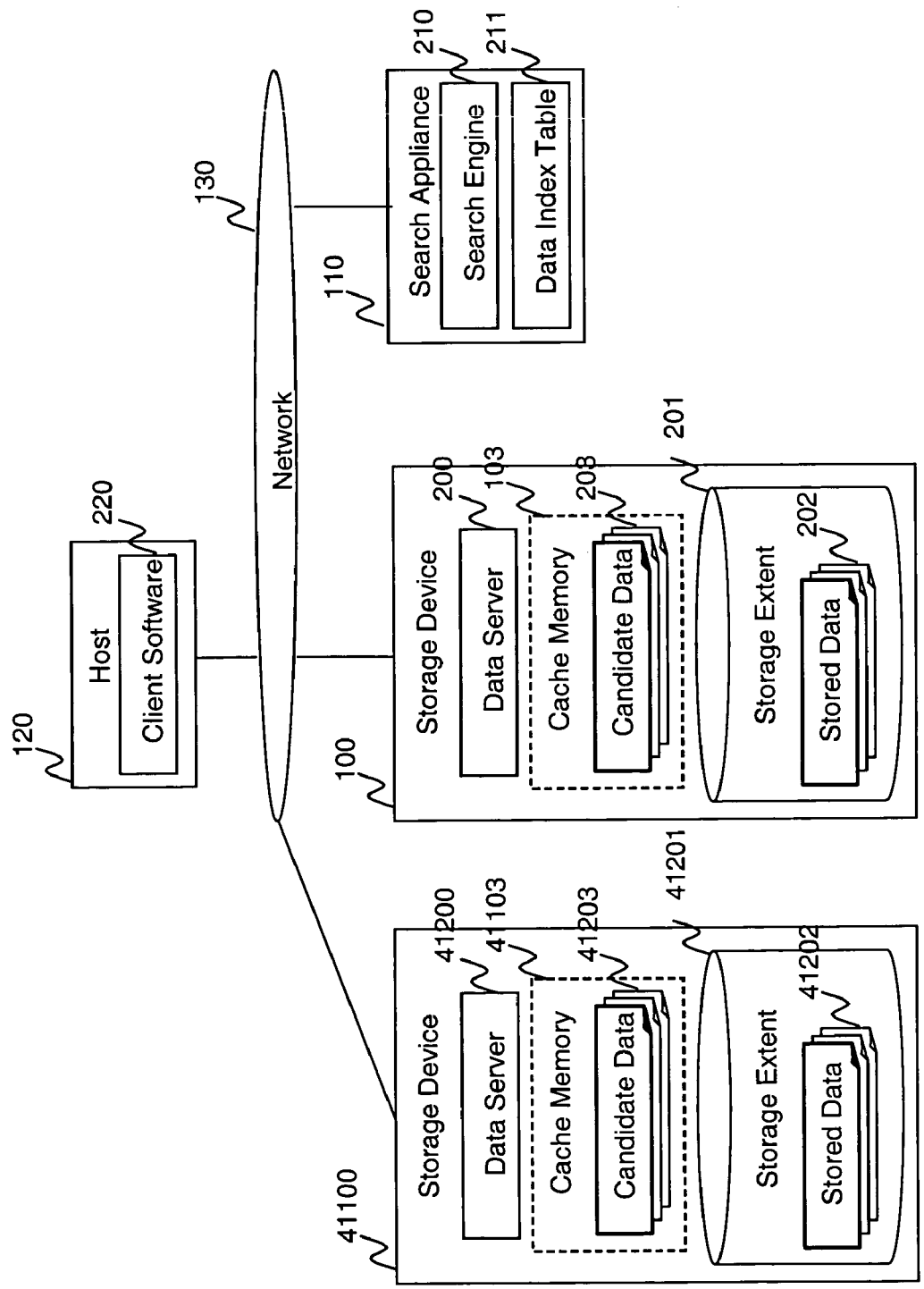
FIG. 17 illustrates an exemplary embodiment of a logical element structure in accordance with the fourth embodiment of the inventive concept.

The logical element structure of the system according to the fourth embodiment will now be described with reference to FIG. 17. Specifically, FIG. 17 shows various software modules and logical object structure of the fourth embodiment. It should be noted that the elements of the Storage Device 100, Search Appliance 110 and Host 120 are same as the corresponding elements shown in FIG. 2 with reference to the first embodiment.

The Storage Device 41100 has exactly the same logical components as the Storage Device 100. In particular, the Storage Device 41100 has its own Data Server 41200 and Storage Extent 41201 to store and manage the data provided by the Client Software 220.

The Data Servers of the described multiple Storage Devices could interoperate in accordance with a master-slave mechanism or in independent manner. For purposes of the following description, it is assumed that the Data Servers operate independently.

Figure 18:
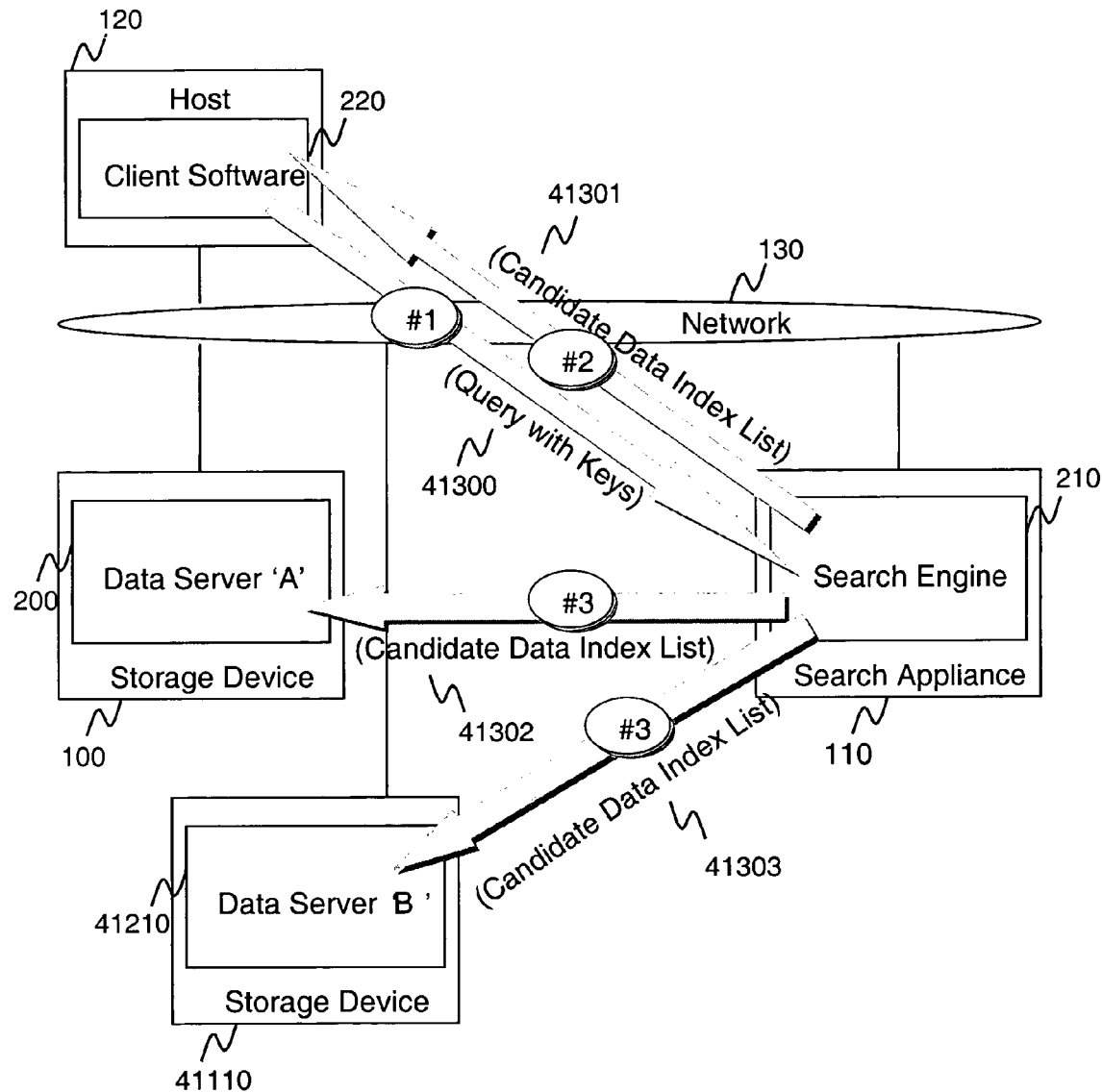
FIG. 18 illustrates an exemplary search request and response path.

FIG. 18 illustrates the manner in which the search request and the corresponding response are sent in this embodiment. Specifically, this embodiment exemplifies the configuration wherein the search request is sent from the Client Software to the Search Engine directly. For example, this configuration may be utilized when the storage system is composed of multiple independent Storage Devices.

As shown in the FIG. 18, the Client Software sends Query with Keys 41300 to the Search Engine 210 (#1) directly, even though the target data is stored either on the Storage Device 100 or the Storage Device 411 10. As shown in FIG. 18, all requests are sent to the Search Engine 210. After the Search Engine has selected the search candidates, it returns the Candidate Data Index List 41301 to the Client Software 220 (#2), again in a direct manner. The returned Candidate Data Index List is a subset of the Data Index Table and it includes information on the Storage Extents where the candidates are stored. The data structure of the Data Index Table of the fourth embodiment of the inventive system is described below. After sending the search result to the Client Software 220, the Search Engine 210 broadcasts the same result list to each Data Server (#3) in the system.

By means of broadcasting the search results by the Search Engine 210 to every Data Server 200 and 41210, each Data Server can pre-fetch the actual data that is being managed by that Data Server.

The data structure of the system in accordance with the fourth embodiment of the inventive concept will now be described with reference to FIG. 19. Specifically, FIG. 19 shows an exemplary data structure of the Data Index Table 211. Most of the columns of that table are identical to the corresponding columns described with reference to FIG. 4 of the first embodiment of the invention. However, the table depicted in FIG. 19 includes an additional column 'StorageExtentID'.

In particular, the StorageExtentID column 42100 contains the identification of Storage Extent (or Storage Device) where the data is stored. The information in this column is used to keep track of location of each data. For instance, row 42101 represents a record corresponding to Stored Data with identification 'D0001', which is stored in Storage Extent 'E100'. Row 42103 represents Stored Data with identification 'D0003', which is stored in a different Storage Extent 'E200'.

The Data Index Table of the fourth embodiment is managed by the Search Engine and updated during the data storing process. It is used when the Search Engine searches for candidates. A subset of the information in the Data Index Table is sent to the Client Software with the results of the search.

Figure 20:
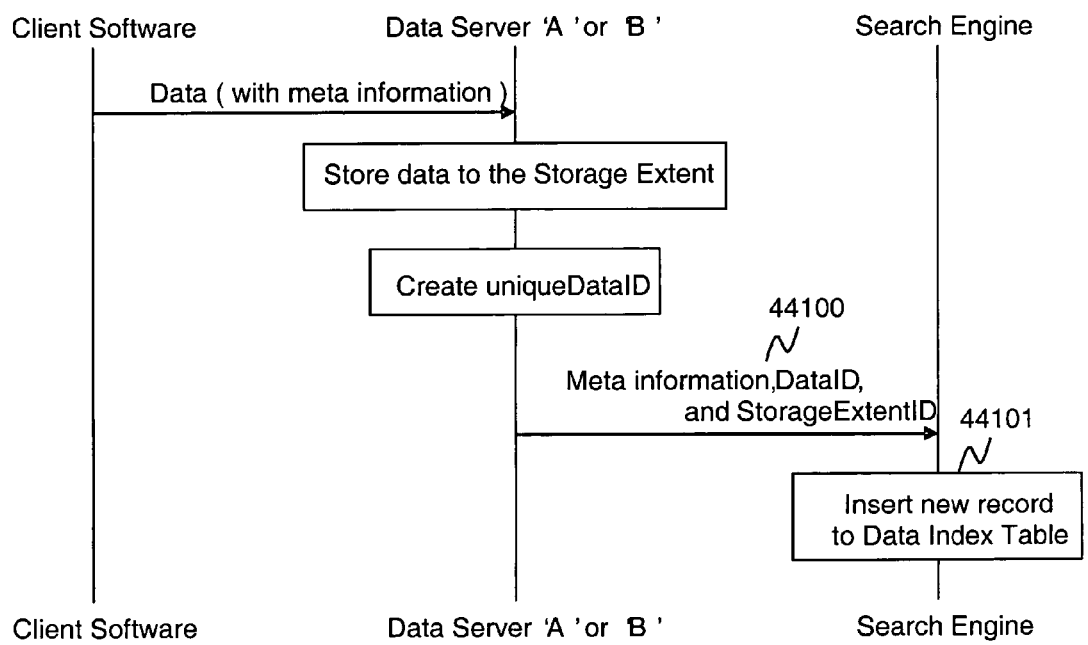
FIG. 20 illustrates an exemplary embodiment of a process of storing data (creating index).
Figure 21:
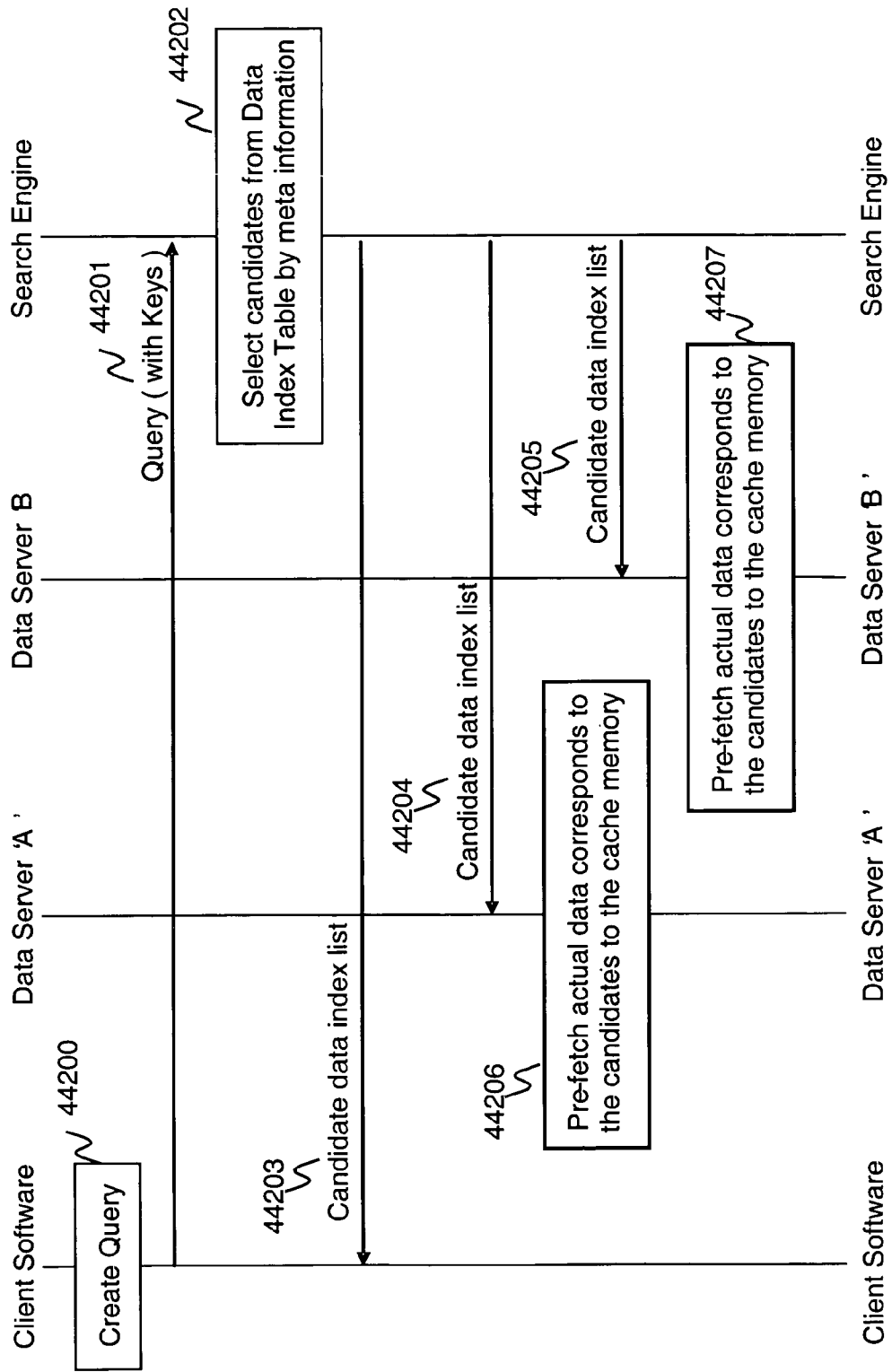
FIG. 21 illustrates an exemplary embodiment of a process for searching data.

The process flow corresponding to the fourth embodiment of the inventive system will now be described with reference to FIGS. 20 and 21. FIG. 20 shows an exemplary process for storing new data on either Storage Device, and creating the corresponding index data at the Search Appliance. Most of the steps of this process are the same as those described with reference to FIG. 5 and the first embodiment of the inventive system. Only the last two steps are different.

Specifically, at step 44100, the Data Server sends the meta information, the created DataID of the Stored Data, and the StorageExtentID of the corresponding Storage Device to the Search Engine. At step 44101, the Search Engine creates a new record in the Data Index Table and inserts into the created record the received information including StorageExtentID. In each request to store data sent by the Client Software to the Data Server, the Client Software identifies the specific Storage Device which is to store the data. In an embodiment of the invention, all Data Servers in the system behave in the same manner, as illustrated in FIG. 20.

The algorithm for searching data will now be described. FIG. 21 shows an exemplary process for searching data candidates in response to a request sent by the Client Software. In particular, at step 44200, the Client Software creates a query statement, which includes meta information descriptive of the target data. At step 44201, the Client Software sends the created query to the Search Engine.

Subsequently, at step 44202, the Search Engine selects candidates in accordance with the specified meta information from the Data Index Table. At step 44203, the Search Engine returns the selected candidates. The selected candidates constitute a subset of Data Index Table, which includes StorageExtentID. In the described embodiment, the information in StorageExtentID describes the location where each data element is stored.

Steps 44204 and 44205: As a follow-up to the step 44203, the Search Engine broadcasts the same list to every Data Server on each Storage Device, enabling each such Data Server to pre-fetch the actual data related to the results of the query.

Then, at steps 44206 and 44207, the Data Server pre-fetches actual data which corresponds to the received candidates from Storage Extent onto the Cache Memory. In this embodiment, each Data Server fetches only the data that is stored in its Storage Extent. Selecting which data is stored in the Storage Extent from the received candidate list is performed simply by utilizing a table that holds DeviceIDs of which the Data Server is managing now.

The fifth embodiment of the inventive system will now be described in detail. This embodiment exemplifies the use of the inventive concept in a configuration, wherein the Cache Memory doesn't have sufficient capacity to store every pre-fetched Candidate Data. Most of the components and operating sequences of the fifth embodiment are the same as those described with reference to the first embodiment. Specifically, the hardware architecture, the logical structure, and data structure of the system of this embodiment are the same as the corresponding components of the first embodiment. In the below description, only the respective differences will be explained.

Figure 22:
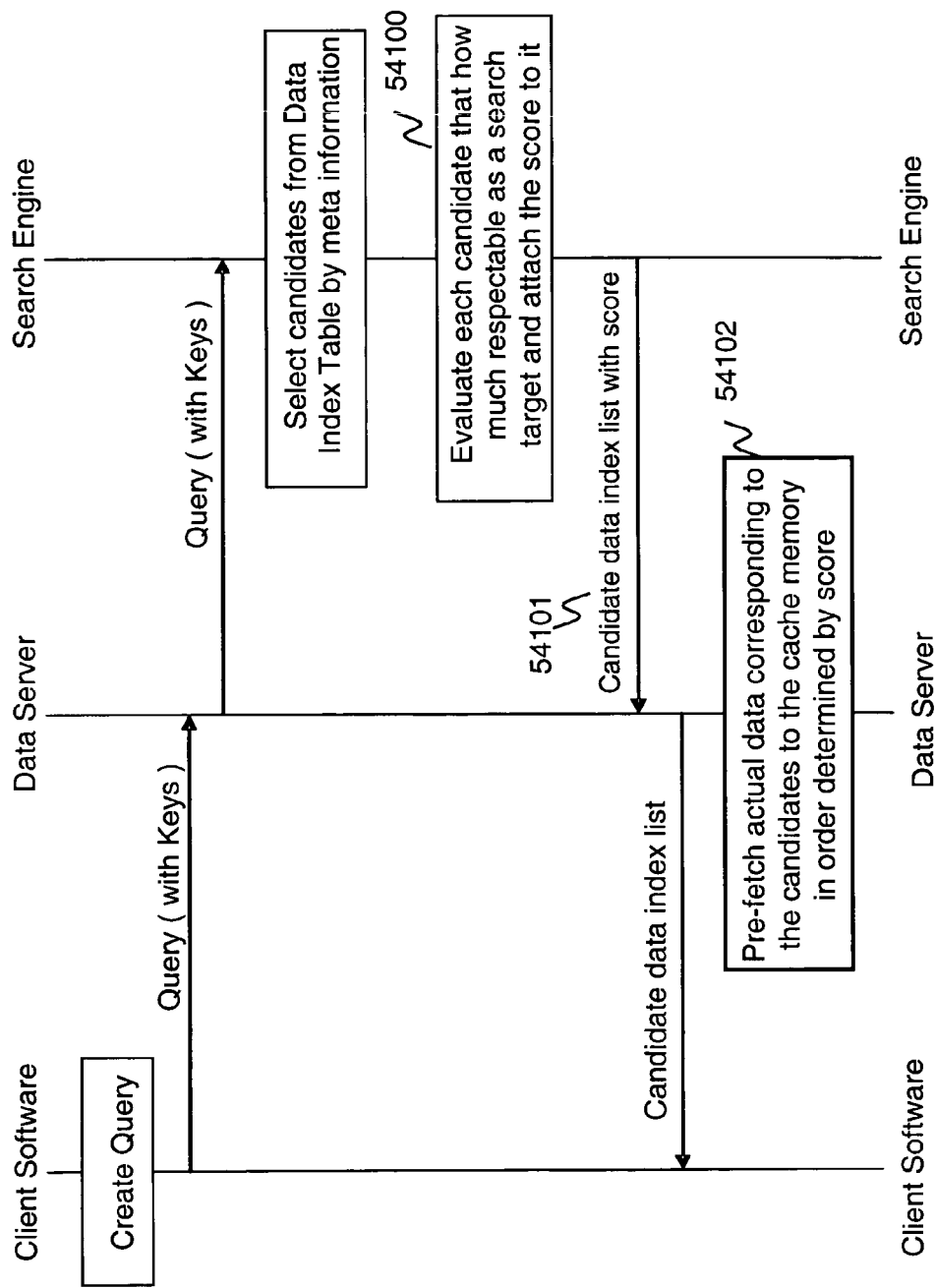
FIG. 22 illustrates another exemplary process for searching data in accordance with the fifth embodiment of the inventive concept.
Figure 23:
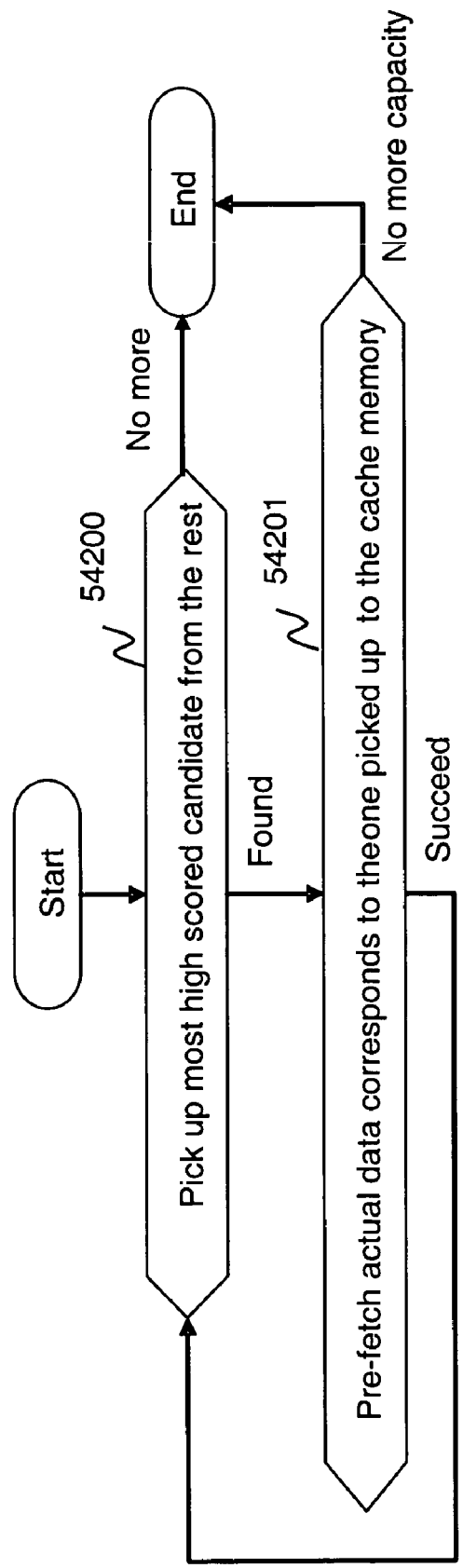
FIG. 23 illustrates an exemplary process for pre-fetching searched data in accordance with the fifth embodiment of the inventive concept.
Figure 24:
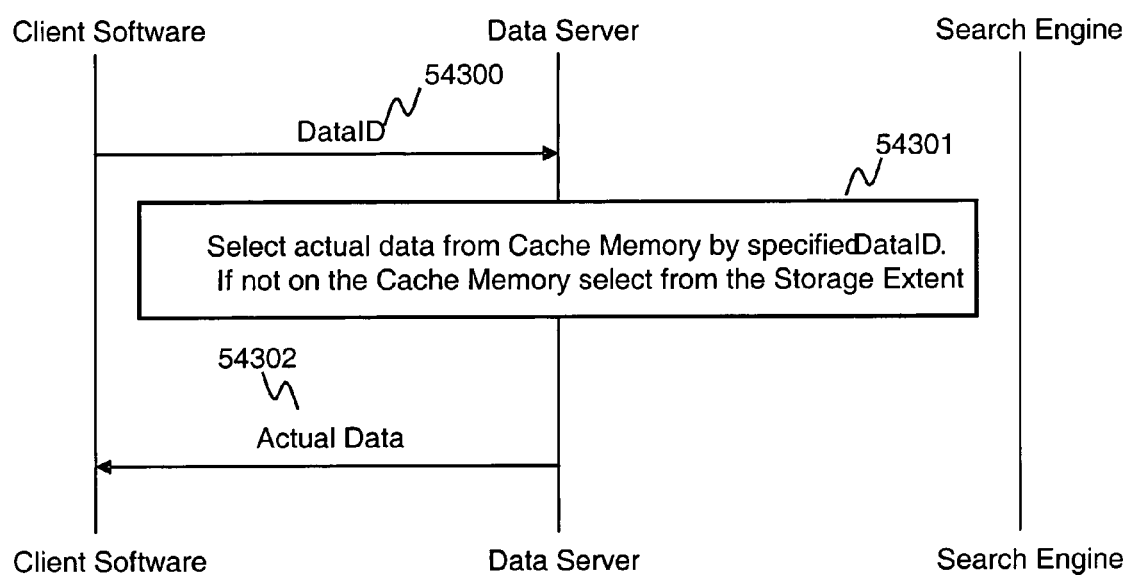
FIG. 24 illustrates an exemplary embodiment of a process for retrieving data.

The process flow of the fifth embodiment is illustrated in FIGS. 22, 23, and 24. First, the data searching process will be explained. FIG. 22 shows an exemplary process for searching data candidates in response to a request from the Client Software. In this embodiment, the Search Engine evaluates each data candidate to determine the likelihood that the specific candidate represents the target data. This likelihood information is used by the Data Server to determine the priority of fetching the data candidate into the Cache Memory. Most of the steps of the search process of the fifth embodiment are same as those described with reference to FIG. 6 of the first embodiment. Therefore, only the differences will be described below.

Specifically, at step 54100, the Search Engine evaluates each candidate that how much respectable as a search target and attach plausible score to each of them (it could be percentage value and attached another 'score' column to the result list). Each of the candidates may be scored using a variety of methods. For instance, the Search Engine may determine how often the candidate data has been accessed, how many search keys are matched, or how recent the corresponding candidate data is. As would be appreciated by those of skill in the art, many other appropriate techniques may be used to generate the candidate score. At step 54101, the Search Engine returns the selected candidates with their score. At step 54102, the Data Server pre-fetches actual data corresponding to the received candidates from Storage Extent into the Cache Memory in accordance with the priority of the score that was associated with each received candidate. Detail of this step is described below.

Now, the pre-fetching of the searched data will be described. FIG. 23 shows an example of pre-fetching of the searched data in this embodiment. Because there is no sufficient capacity on the Cache Memory the Data Server fetches respectable data only from search result as much as possible. At steps 54200 and 54201, the process loops until every candidate is pre-fetched or the Cache Memory is entirely used.

At step 54200, a not yet processed candidate with the highest score is picked from the search results received from Search Appliance. When the actual data for every candidate is pre-fetched into the Cache Memory, the process ends. Otherwise, the process proceeds to step 54201.

At step 54201, the process tries to retrieve actual data from the Storage Extent and fetch it into the Cache Memory. If the retrieval and fetching succeed, the process reverts back to step 54200. If an error is detected, it may indicate that the Cache Memory doesn't have enough space to fetch another Candidate Data. In this case, the process terminates.

Finally, the data retrieving process will be described. FIG. 24 illustrates an exemplary embodiment of a process for retrieving actual data from Storage Device according to the described embodiment of the inventive concept. In the shown embodiment, not every candidate is being fetched into the Cache Memory. Therefore the Data Sever retrieves desired data from Storage Extent if it has not been pre-fetched.

At step 54300, the Client Software sends DataID of the desired Candidate Data to the Data Server. This DataID is selected from the search results previously received in the search process. At step 54301, the Data Server selects a Candidate Data from the Cache Memory by specified DataID. If the desired data has not been pre-fetched to the Cache Memory, then the Data Server retrieves it from the Storage Extent. At step 54302, the Data Server returns the Candidate Data obtained in step 54301.

As may be appreciated by those of skill in the art, the present invention may be deployed in any storage system having data search functionality. Such systems include, without limitation, music/video data library systems, CAD data library systems, observing camera data archive systems, and phone call conversation archive system.

Figure 25:
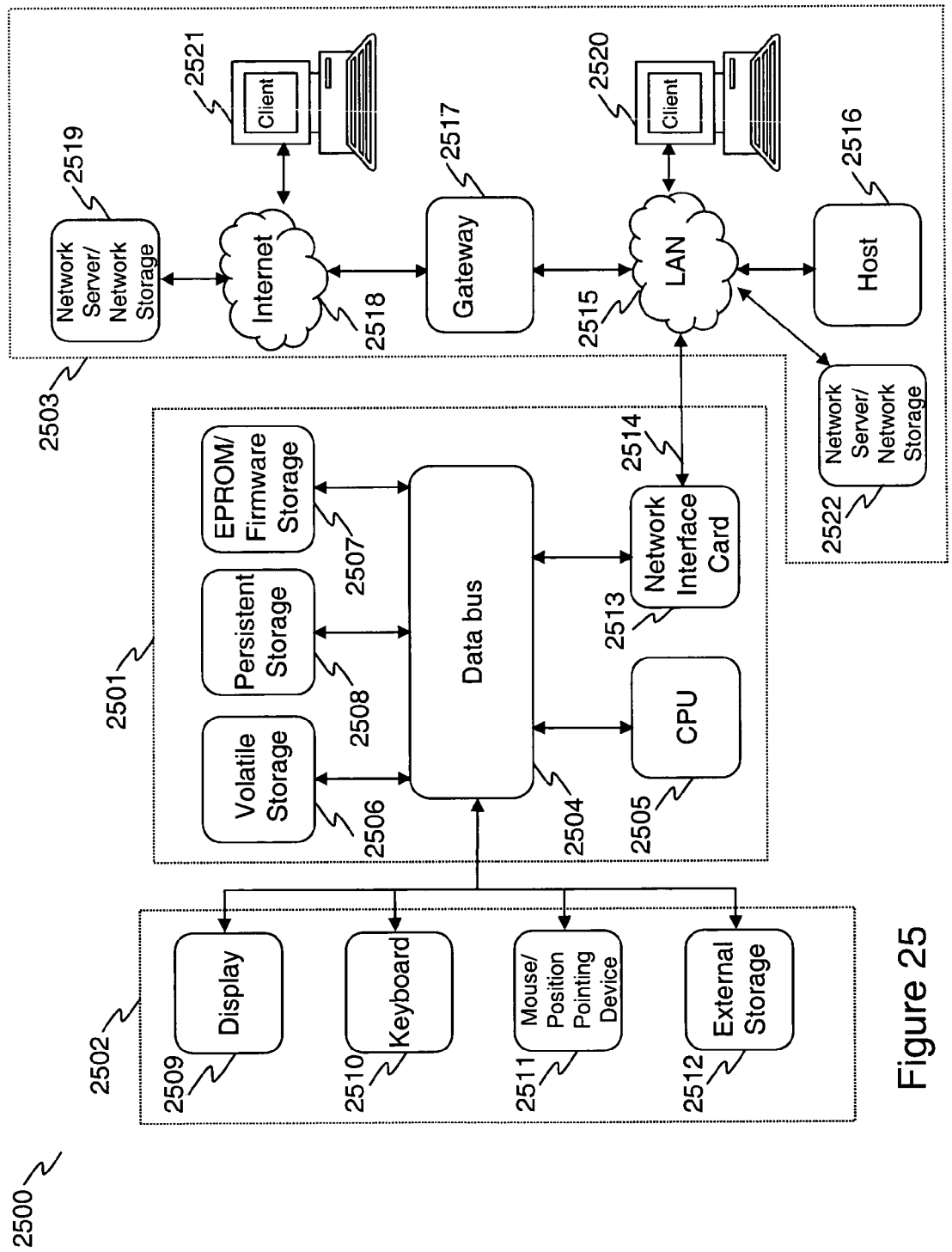
FIG. 25 illustrates an exemplary embodiment of a computer platform upon which the inventive system may be implemented.

FIG. 25 is a block diagram that illustrates an embodiment of a general or special purpose computer system and network architecture 2500 upon which an embodiment of the inventive computerized storage and retrieval system with search result pre-fetching capability may be based. The system architecture 2500 may include a general purpose or special purpose computer platform 2501, peripheral devices 2502 and various network resources 2503. Various elements of the described computer platform 2501 may be used singly or in any suitable combination in implementing the aforementioned Storage Device 100, including the Storage Controller 101, Search Appliance 110 and/or Host 120, described hereinabove.

The computer platform 2501 may generally include a processor 2505 for handling various information and performing other computational and control tasks. The computer platform 2501 may also include a volatile storage 2506, such as a random access memory (RAM) or other similar dynamic storage device for storing various information as well as instructions to be executed by processor 2505. The volatile storage 2506 also may be used for storing temporary variables or other intermediate information during execution of instructions by processor 2505. The volatile storage 2506 of the computer platform 2501, when it is used to implement the storage device 100, may additionally incorporate the cache memory 103. Computer platform 2501 may further include a read only memory or erasable programmable read only memory (ROM or EPROM) 2507 or other static storage device for storing static information and instructions for processor 2505, such as basic input-output system (BIOS), as well as various system configuration parameters. A persistent storage device 2508, such as a magnetic disk, optical disk, or solid-state flash memory device may be provided for storing information and instructions. Upon start of the computer platform 2501, it may be configured to automatically load and execute the instructions stored in the storage devices 2507 and/or 2508.

The aforementioned processor 2505, as well as storage devices 2506, 2507 and 2508 may be interconnected using a data bus 2504 facilitating exchange of data among various elements of the computer system 2501. The data bus 2504 may be implemented using any known computer interconnect mechanism, including, without limitation, peripheral component interconnect (PCI), small computer system interface (SCSI), Infiniband, etc.

When the computer platform 2501 is utilized to implement the Host 120, it may be coupled via bus 2504 to a display 2509, such as a cathode ray tube (CRT), plasma display, or a liquid crystal display (LCD), for displaying information to a system administrator or user of the computer platform 2501. An input device 2510, including alphanumeric and other keys, is coupled to bus 2501 for communicating information and command selections to processor 2505. Another type of user input device is cursor control device 2511, such as a mouse, a trackball, or cursor direction keys for communicating direction information and command selections to processor 2504 and for controlling cursor movement on display 2509. This input device typically has two degrees of freedom in two axes, a first axis (e.g., x) and a second axis (e.g., y), that allows the device to specify positions in a plane.

When the computer platform 2501 is used to implement the Storage Device 100, one or more external storage units 2512 may be connected to the computer platform 2501 via bus 2504 to implement storage units 105 for storing searchable data. Additionally or alternatively, the searchable data storage devices 105 may be implemented using persistent storage 2508 or network storage 2519 or 2522. In an embodiment of the computer system 2500, the external removable storage device 2512 may be used to facilitate exchange of data with other computer systems.

According to one embodiment of the invention, the functions of the Storage Device 100, including the Storage Controller 101, Search Appliance 110 and/or Host 120 are performed by computer platform 2501 in response to the processor 2505 executing one or more sequences of one or more instructions contained in the volatile memory 2506. Such instructions may be read into volatile memory 2506 from another computer-readable medium, such as persistent storage device 2508. Execution of the sequences of instructions contained in the volatile memory 2506 causes processor 2505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that is capable of providing, directly or indirectly, instructions to processor 2505 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 2508. Volatile media includes dynamic memory, such as volatile storage 2506. Transmission media includes coaxial cables, copper wire and fiber optics, including the wires that comprise data bus 2504. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a compact disk read-only memory (CD-ROM), any other optical medium, punch-cards, papertape, any-other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 2505 for execution. For example, the instructions may initially be carried on a magnetic disk from a remote computer. Alternatively, a remote computer can load the instructions into its dynamic memory and send the instructions over a telephone line using a modem. A modem local to computer system 2500 can receive the data on the telephone line and use an infra-red transmitter to convert the data to an infra-red signal. An infra-red detector can receive the data carried in the infra-red signal and appropriate circuitry can place the data on the data bus 2504. The bus 2504 carries the data to the volatile storage 2506, from which processor 2505 retrieves and executes the instructions. The instructions received by the volatile memory 2506 may optionally be stored on persistent storage device 2508 either before or after execution by processor 2505. The instructions may also be downloaded into the computer platform 2501 via Internet using a variety of network data communication protocols well known in the art.

The aforesaid Storage Device 100, Search Appliance 110 and/or Host 120 are designed to operate on a computer network 130. To this end, the computer platform 2501 also includes a communication interface, such as network interface card 2513 coupled to the data bus 2504. Communication interface 2513 provides a two-way data communication coupling to a network link 2514 that is connected to a local network 2515. For example, communication interface 2513 may be an integrated services digital network (ISDN) card or a modem to provide a data communication connection to a corresponding type of telephone line. As another example, communication interface 2513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 2513 sends and receives electrical, electromagnetic or optical signals that carry digital data streams representing various types of information.

Network link 2513 typically provides data communication through one or more networks to other network resources. For example, network link 2514 may provide a connection through local network 2515 to a host computer 2516, or an additional network storage/server 2522. Additionally or alternatively, the network link 2513 may connect through gateway/firewall 2517 to the wide-area or global network 2518, such as an Internet. Thus, the computer platform 2501 can access network resources located anywhere on the Internet 2518, such as a remote network storage/server 2519. On the other hand, the computer platform 2501 may also be accessed by clients located anywhere on the local area network 2515 and/or the Internet 2518. The network clients 2520 and 2521 may themselves be implemented based on the computer platform similar to the platform 2501.

Local network 2515 and the Internet 2518 both use electrical, electromagnetic or optical signals that carry digital data streams. The signals through the various networks and the signals on network link 2514 and through communication interface 2513, which carry the digital data to and from computer platform 2501, are exemplary forms of carrier waves transporting the information.

Computer platform 2501 can send messages and receive data, including program code, through the variety of network(s) including Internet 2518 and LAN 2515, network link 2514 and communication interface 2513. In the Internet example, when the system 2501 acts as a network server, it might transmit a requested code or data for an application program running on client(s) 2520 and/or 2521 through Internet 2518, gateway/firewall 2517, local area network 2515 and communication interface 2513. Similarly, it may receive code from other network resources.

The received code may be executed by processor 2505 as it is received, and/or stored in persistent or volatile storage devices 2508 and 2506, respectively, or other non-volatile storage for later execution. In this manner, computer system 2501 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the data search and retrieval system. It is intended that the specification and examples be considered as exemplary only, with a true scope and spirit of the invention being indicated by the following claims.

What is claimed is:

1. A computerized storage system comprising:
   a client host executing a client software operable to compose a search query in response to a user request;
   a storage device comprising a cache memory and operable to receive the search query from the client host; and
   a data search appliance operable to receive the search query from the storage device and invoke a search process to find search candidates;
   wherein upon the completion of the search process, the search appliance is operable to return the search candidate information to the storage device,
   wherein said search candidate information includes a plurality of said search candidates;
   wherein upon receipt of the search candidate information from the search appliance, the storage device is configured to pass the search candidate information to the client host and to pre-fetch actual data corresponding to the search candidate information into the cache memory, and
   wherein, in response to a request from the client host, the storage device returns selected ones of the actual data corresponding to one of the search candidate from said plurality of search candidates selected by the user, from the cache memory to the client host;
   wherein said pre-fetch of actual data corresponding to the search candidate information into the cache memory is performed before the search candidate is selected by the user.

2. The computerized storage system of claim 1, wherein the client host, the storage device and the data search appliance are interconnected using a network.

3. The computerized storage system of claim 1, wherein the storage device comprises a storage extent storing the data, wherein the data search appliance is operable to find the search candidate information within the stored data.

4. The computerized storage system of claim 3, wherein the search appliance comprises a data index table comprising meta data corresponding to the stored data.

5. The computerized storage system of claim 4, wherein the data index table comprises data description and at least one key.

6. The computerized storage system of claim 4, wherein the data index table is updated when new data is written to the storage device.

7. The computerized storage system of claim 1, wherein the query comprises at least one key.

8. The computerized storage system of claim 1, wherein the search candidate information comprises candidate data index list.

9. The computerized storage system of claim 8, wherein the candidate data index list comprises data identifier and wherein the client host uses the data identifier to retrieve search candidate data from the cache memory.

10. The computerized storage system of claim 1, wherein the data search appliance is embedded into the storage device.

11. The computerized storage system of claim 10, wherein the data search appliance comprises a search engine, and the storage device comprises a data server, and wherein the search engine and the data server internally communicate with one another.

12. The computerized storage system of claim 1, further comprising at least one external storage device operatively coupled to the storage device, wherein at least a portion of data searched by the data search appliance is stored in the at least one external storage device.

13. The computerized storage system of claim 12, wherein the at least one external storage device is coupled to the storage device via a network.

14. The computerized storage system of claim 12, further comprising a data location table comprising information on a storage device storing each data.

15. The computerized storage system of claim 14, wherein the data location table further comprises information indicating whether the storage device storing each data is powered on.

16. The computerized storage system of claim 14, wherein the storage device is operable, for each candidate in the candidate information returned by the data search appliance, to use the data location table to locate a storage device storing actual data corresponding to the candidate and, if the located storage device is not powered, to power ON the located storage device.

17. The computerized storage system of claim 14, wherein the storage device comprises a data server operable, in response to a data store request received from the client host, to assign the received data to one of available storage devices and to add a corresponding entry to the data location table.

18. The computerized storage system of claim 17, wherein the data store request comprises the received data and the corresponding meta data information.

19. The computerized storage system of claim 18, wherein the data server is operable to provide the meta data information and a data identifier to a search engine of the data search appliance.

20. The computerized storage system of claim 1, wherein the data search appliance is additionally operable, for each search candidate, to calculate a likelihood that the search candidate represents a target data, wherein the storage system pre-fetches the actual data corresponding the search candidate information based on the calculated likelihood.

21. The computerized storage system of claim 20, wherein a size of the actual data corresponding to all search candidates exceeds a size of the cache memory.

22. A computerized storage system comprising:
    a client host executing a client software operable to compose a search query in response to a user request;
    a data search appliance operable to receive the search query from the client host and invoke a search process to find search candidates; wherein upon the completion of the search process, the search appliance is operable to return the search candidate information to the client host; wherein said search candidate information includes a plurality of said search candidates; and
    a storage device comprising a cache memory and a storage extent, wherein the data search appliance is operable to provide the search candidate information to the storage device and wherein upon receipt of the search candidate information from the search appliance, the storage device is configured to pre-fetch actual data corresponding to the search candidate information into the cache memory wherein, in response to a request from the client host, the storage device returns selected ones of the actual data corresponding to one of the search candidate from said plurality of search candidates selected by the user, from the cache memory to the client host;

wherein said pre-fetch of actual data corresponding to the search candidate information into the cache memory is performed before the search candidate is selected by the user.

23. The computerized storage system of claim 22, wherein the data search appliance comprises a data index table comprising meta data corresponding to data stored in the storage extent.

24. The computerized storage system of claim 23, wherein the data index table comprises data description, at least one key, a unique data identifier and a storage extent identifier.

25. A computer-implemented method for searching data, the method comprising:

receiving a search query from a client;

invoking a search process to search stored data for search candidates matching the search query to produce search candidate information;

returning the search candidate information to the client wherein said search candidate information includes a plurality of said search candidates;

pre-fetching actual data corresponding to the search candidate information into a cache memory;

receiving a request from the client, the request including selected ones of the search candidate information; and returning to the client the actual data corresponding to the selected ones of the search candidate information from the cache memory;

wherein said pre-fetch of actual data corresponding to the search candidate information into the cache memory is performed before the search candidate is selected by the user.

26. The computer-implemented method of claim 25, wherein the search process uses a data index table comprising meta data corresponding to the stored data.

27. The computer-implemented method of claim 25, wherein at least a portion of the stored data is located on an external storage device.

28. The computer-implemented method of claim 25, further comprising, for each search candidate, calculating a likelihood that the search candidate represents a target data, wherein the pre-fetching is performed based on the calculated likelihood.

* * * * *